(12) United States Patent
Agarwal et al.

(10) Patent No.: US 11,573,861 B2
(45) Date of Patent: Feb. 7, 2023

(54) CONTINUOUS DATA PROTECTION USING A WRITE FILTER

(71) Applicant: Cohesity, Inc., San Jose, CA (US)

(72) Inventors: Shobhit Agarwal, San Jose, CA (US); Chinmaya Manjunath, San Jose, CA (US); Kishan Venkata Sravan Nerella, San Jose, CA (US); Ashish Patwardhan, Cupertino, CA (US)

(73) Assignee: Cohesity, Inc., San Jose, CA (US)

( * ) Notice: Subject to any disclaimer, the term of this patent is extended or adjusted under 35 U.S.C. 154(b) by 26 days.

(21) Appl. No.: 16/549,719

(22) Filed: Aug. 23, 2019

(65) Prior Publication Data

US 2020/0356442 A1 Nov. 12, 2020

Related U.S. Application Data

(60) Provisional application No. 62/846,488, filed on May 10, 2019.

(51) Int. Cl.
| | |
|---|---|
| *G06F 16/00* | (2019.01) |
| *G06F 11/14* | (2006.01) |
| *G06F 16/901* | (2019.01) |
| *G06F 16/17* | (2019.01) |
| *G06F 16/11* | (2019.01) |

(52) U.S. Cl.
CPC ...... *G06F 11/1451* (2013.01); *G06F 11/1469* (2013.01); *G06F 16/128* (2019.01); *G06F 16/1734* (2019.01); *G06F 16/9027* (2019.01)

(58) Field of Classification Search
None
See application file for complete search history.

(56) References Cited

U.S. PATENT DOCUMENTS

| | | |
|---|---|---|
| 7,421,648 B1 | 9/2008 | Davis |
| 7,437,764 B1 | 10/2008 | Sobel |
| 3,020,037 A1 | 9/2011 | Schwartz |
| 8,086,585 B1 | 12/2011 | Brashers |
| 8,112,661 B1 | 2/2012 | La France |
| 8,190,583 B1 | 5/2012 | Shekar |
| 8,312,471 B2 | 11/2012 | Davis |
| 8,364,648 B1 | 1/2013 | Sim-Tang |
| 8,607,342 B1 | 12/2013 | Liao |
| 9,268,689 B1 | 2/2016 | Chen |

(Continued)

OTHER PUBLICATIONS

Cohesity, Cohesity Data Protection White Paper, 2016, Cohesity, pp. 1-12 (Year: 2016).

(Continued)

*Primary Examiner* — Farhan M Syed
(74) *Attorney, Agent, or Firm* — Van Pelt, Yi & James LLP

(57) ABSTRACT

A reference snapshot of a storage is stored. Data changes that modify the storage are received. The data changes are captured by a write filter of the storage. The received data changes are logged. The data changes occurring after an instance time of the reference snapshot are applied to the reference snapshot to generate a first incremental snapshot corresponding to a first intermediate reference restoration point. The data changes occurring after an instance time of the first incremental snapshot are applied to the first incremental snapshot to generate a second incremental snapshot corresponding to a second intermediate reference restoration point.

14 Claims, 17 Drawing Sheets

(56) References Cited

U.S. PATENT DOCUMENTS

| Patent/Publication | Date | Inventor | Classification |
|---|---|---|---|
| 9,304,864 B1* | 4/2016 | Bushman | G06F 3/067 |
| 9,311,190 B1* | 4/2016 | Bushman | G06F 11/1446 |
| 9,361,185 B1* | 6/2016 | Bushman | G06F 11/1466 |
| 9,471,441 B1 | 10/2016 | Lyadvinsky | |
| 9,594,514 B1 | 3/2017 | Bono | |
| 9,621,428 B1 | 4/2017 | Lev | |
| 9,983,812 B1 | 5/2018 | Don | |
| 10,037,223 B2 | 7/2018 | Park | |
| 10,089,148 B1 | 10/2018 | Blitzer | |
| 10,162,528 B2* | 12/2018 | Sancheti | G06F 11/1453 |
| 10,169,077 B1 | 1/2019 | Sigl, Sr. | |
| 10,175,896 B2* | 1/2019 | Battaje | G06F 12/0246 |
| 10,275,321 B1 | 4/2019 | Bajaj | |
| 10,496,497 B1 | 12/2019 | Yadav | |
| 10,503,612 B1 | 12/2019 | Wang | |
| 10,545,776 B1 | 1/2020 | Kowalski | |
| 10,877,928 B2* | 12/2020 | Nagrale | G06F 11/1458 |
| 10,896,097 B1 | 1/2021 | Purcell | |
| 11,036,594 B1 | 6/2021 | Shats | |
| 11,176,154 B1 | 11/2021 | Dasgupta | |
| 2003/0033344 A1 | 2/2003 | Abbott | |
| 2004/0250033 A1* | 12/2004 | Prahlad | G06F 11/1451 711/162 |
| 2006/0069861 A1 | 3/2006 | Amano | |
| 2006/0182255 A1 | 8/2006 | Luck, Jr. | |
| 2007/0153675 A1 | 7/2007 | Baglin | |
| 2008/0208926 A1 | 8/2008 | Smoot | |
| 2009/0089657 A1 | 4/2009 | Davis | |
| 2009/0171707 A1* | 7/2009 | Bobak | G06Q 10/06 705/7.23 |
| 2009/0313503 A1 | 12/2009 | Atluri | |
| 2010/0031170 A1 | 2/2010 | Carullo | |
| 2010/0070725 A1* | 3/2010 | Prahlad | G06F 11/1453 718/1 |
| 2010/0106933 A1 | 4/2010 | Kamila | |
| 2010/0122248 A1 | 5/2010 | Robinson | |
| 2011/0022879 A1 | 1/2011 | Chavda | |
| 2011/0106776 A1 | 5/2011 | Vik | |
| 2011/0107246 A1 | 5/2011 | Vik | |
| 2012/0203742 A1 | 8/2012 | Goodman | |
| 2013/0006943 A1 | 1/2013 | Chavda | |
| 2013/0179481 A1 | 7/2013 | Halevy | |
| 2013/0191347 A1 | 7/2013 | Bensinger | |
| 2013/0219135 A1 | 8/2013 | Knowles | |
| 2013/0227558 A1 | 8/2013 | Du | |
| 2013/0232480 A1 | 9/2013 | Winterfeldt | |
| 2013/0232497 A1 | 9/2013 | Jalagam | |
| 2013/0254402 A1 | 9/2013 | Vibhor | |
| 2013/0322335 A1 | 12/2013 | Smith | |
| 2014/0040206 A1 | 2/2014 | Ramakrishnan | |
| 2014/0052692 A1 | 2/2014 | Zhang | |
| 2014/0059306 A1 | 2/2014 | Bender | |
| 2014/0165060 A1 | 6/2014 | Muller | |
| 2014/0297588 A1 | 10/2014 | Babashetty | |
| 2014/0359229 A1 | 12/2014 | Cota-Robles | |
| 2014/0372553 A1 | 12/2014 | Blackburn | |
| 2015/0193487 A1 | 7/2015 | Demidov | |
| 2015/0254150 A1 | 9/2015 | Gordon | |
| 2015/0278046 A1 | 10/2015 | Zellermayer | |
| 2015/0347242 A1 | 12/2015 | Martos | |
| 2015/0363270 A1 | 12/2015 | Hammer | |
| 2015/0370502 A1 | 12/2015 | Aron | |
| 2015/0378765 A1 | 12/2015 | Singh | |
| 2016/0004450 A1 | 1/2016 | Lakshman | |
| 2016/0034356 A1 | 2/2016 | Aron | |
| 2016/0048408 A1 | 2/2016 | Madhu | |
| 2016/0070714 A1 | 3/2016 | D Sa | |
| 2016/0085636 A1 | 3/2016 | Dornemann | |
| 2016/0125059 A1* | 5/2016 | Jain | G06F 3/0641 707/639 |
| 2016/0162378 A1 | 6/2016 | Garlapati | |
| 2016/0188898 A1 | 6/2016 | Karinta | |
| 2016/0203060 A1 | 7/2016 | Singh | |
| 2016/0232061 A1 | 8/2016 | Gaschler | |
| 2016/0321339 A1 | 11/2016 | Tekade | |
| 2016/0357640 A1* | 12/2016 | Bushman | G06F 11/1446 |
| 2016/0357641 A1* | 12/2016 | Bushman | G06F 3/0619 |
| 2016/0357769 A1* | 12/2016 | Bushman | G06F 16/128 |
| 2017/0031613 A1 | 2/2017 | Lee | |
| 2017/0031622 A1 | 2/2017 | Nagarajan | |
| 2017/0060710 A1 | 3/2017 | Ramani | |
| 2017/0060884 A1 | 3/2017 | Goodman | |
| 2017/0123935 A1 | 5/2017 | Pandit | |
| 2017/0168903 A1* | 6/2017 | Dornemann | G06F 11/2038 |
| 2017/0185491 A1 | 6/2017 | Hajare | |
| 2017/0185729 A1 | 6/2017 | Boray | |
| 2017/0193116 A1 | 7/2017 | Wong | |
| 2017/0206212 A1 | 7/2017 | Srivilliputtur Mannarswamy | |
| 2017/0212680 A1 | 7/2017 | Waghulde | |
| 2017/0337109 A1 | 11/2017 | Ramu | |
| 2018/0004437 A1* | 1/2018 | Battaje | G06F 3/065 |
| 2018/0004764 A1 | 1/2018 | Sudarsanam | |
| 2018/0060106 A1 | 3/2018 | Madtha | |
| 2018/0060187 A1 | 3/2018 | Chavda | |
| 2018/0081766 A1 | 3/2018 | Ghuge | |
| 2018/0081902 A1 | 3/2018 | McKenzie | |
| 2018/0088973 A1 | 3/2018 | Subhraveti | |
| 2018/0113625 A1* | 4/2018 | Sancheti | G06F 11/1402 |
| 2018/0196820 A1 | 7/2018 | Kremer | |
| 2018/0212896 A1 | 7/2018 | Chang | |
| 2018/0253414 A1 | 9/2018 | Hailpern | |
| 2018/0293374 A1* | 10/2018 | Chen | G06F 9/45558 |
| 2018/0316577 A1 | 11/2018 | Freeman | |
| 2018/0329637 A1* | 11/2018 | Battaje | G06F 3/067 |
| 2019/0065277 A1 | 2/2019 | Raikov | |
| 2019/0073276 A1 | 3/2019 | Yuen | |
| 2019/0108266 A1 | 4/2019 | Manvar | |
| 2019/0129799 A1* | 5/2019 | Kumarasamy | G06F 11/1451 |
| 2019/0132203 A1 | 5/2019 | Wince | |
| 2019/0197020 A1 | 6/2019 | Yap | |
| 2019/0215358 A1 | 7/2019 | Kobayashi | |
| 2019/0220198 A1 | 7/2019 | Kashi Visvanathan | |
| 2019/0228097 A1 | 7/2019 | Kassa | |
| 2019/0278662 A1* | 9/2019 | Nagrale | G06F 11/1451 |
| 2019/0278663 A1* | 9/2019 | Mehta | G06F 3/067 |
| 2020/0026538 A1 | 1/2020 | Cui | |
| 2020/0034254 A1 | 1/2020 | Natanzon | |
| 2020/0057567 A1 | 2/2020 | Hutcheson | |
| 2020/0057669 A1 | 2/2020 | Hutcheson | |
| 2020/0110755 A1 | 4/2020 | Waldman | |
| 2020/0159625 A1 | 5/2020 | Hutcheson | |
| 2020/0167238 A1* | 5/2020 | Killamsetti | G06F 11/1461 |
| 2020/0183794 A1* | 6/2020 | Dwarampudi | G06F 11/1469 |
| 2020/0233571 A1 | 7/2020 | Yuravlivker | |
| 2020/0278274 A1 | 9/2020 | Shetty | |
| 2020/0285449 A1 | 9/2020 | McIntosh | |
| 2020/0394072 A1 | 12/2020 | Sreekantaswamy | |
| 2021/0056203 A1 | 2/2021 | Qiao | |
| 2021/0081087 A1 | 3/2021 | Wayne | |
| 2021/0103556 A1* | 4/2021 | Nagrale | G06F 11/1458 |
| 2021/0232579 A1 | 7/2021 | Schechter | |
| 2021/0318851 A1 | 10/2021 | Sahu | |
| 2021/0385254 A1 | 12/2021 | Pettit | |

OTHER PUBLICATIONS

Gaetan Castlelein, Cohesity SnapFS and SnapTree, Aug. 9, 2017, Cohesity, pp. 1-4 (Year: 2017).

"Backup Solution Guide"—Synology https://download.synology.com/download/www-res/brochure/backup_solution_guide_en-global .pdf (Year: 2019).

"Recovering File from an Amazon EBS vol. Backup"—Josh Rad, AWS, Feb. 1, 2019 https://aws.amazon.com/blogs/compute/recovering-files-from-an-amazon-ebs-volume-backup/ (Year: 2019).

Actifio "Getting Started with Actifio VDP." Sep. 23, 2020. https://web.archive.org/web/20200923181125/https://docs.actifio.com/10.0/PDFs/Introducing.pdf (Year: 2020).

C. Grace. "Site Recovery Manager Technical Overview." Dec. 1, 2020. https://web.archive.org/web/20201201181602/https://core.vmware.com/resource/site-recovery-manager-technical-overview (Year: 2020).

(56) References Cited

OTHER PUBLICATIONS

Cloud Endure. "Cloud Endure Documentation." Dec. 1, 2020. https://web.archive.org/web/20201201022045/https7/docs.cloudendure.com/CloudEndure%Documentation.htm (Year: 2020).

M. Chuang. "Announcing VMware Cloud Disaster Recovery." Sep. 29, 2020. https://web.archive.org/web/20201102133037/https://blogs.vmware.com/virtualblocks/2020/09/29/announcing-vmware-cloud-disaster-recovery/ (Year: 2020).

M. McLaughlin. "VMware Cloud Disaster Recovery is Now Available." Oct. 20, 2020. https://web.archive.org/web/20201103021801/https://blogs.vmware.com/virtualblocks/2020/10/20/vmware-cloud-disaster-recovery-is-now-available/ (Year: 2020).

Red Hat. "Red Hat Virtualization 4.3 Disaster Recovery Guide." Jul. 17, 2019. https://web.archive.org/web/20190717013417/https://access.redhat.com/documentation/en-US/red_hat_virtualization/4.3/html/disaster_recovery_guide/index (Year: 2019).

Red Hat. "Red Hat Virtualization 4.3 Product Guide." Jul. 17, 2019. https://web.archive.org/web/20190717013254/https://access.virtualization/4.3/html/product_guide/index (Year: 2019).

VMware. "Site Recovery Manager Administration." May 31, 2019. https://docs.vmware.com/en/Site-Recovery-Manager/8.5/srm-admin-8-5.pdf (Year: 2019).

VMware. "Site Recovery Manager Evaluation Guide." Oct. 19, 2020. https://web.archive.org/web/20201019155135/https://core.vmware.com/resource/site-recovery-manager-evaluation-guide (Year: 2020).

Zerto. "Zerto Disaster Recovery Guide." Sep. 2016. https://www.zerto.com/wp-content/uploads/2016/09/Zerto-Disaster-Recovery-Guide_CIO_eBook.pdf (Year: 2016).

\* cited by examiner

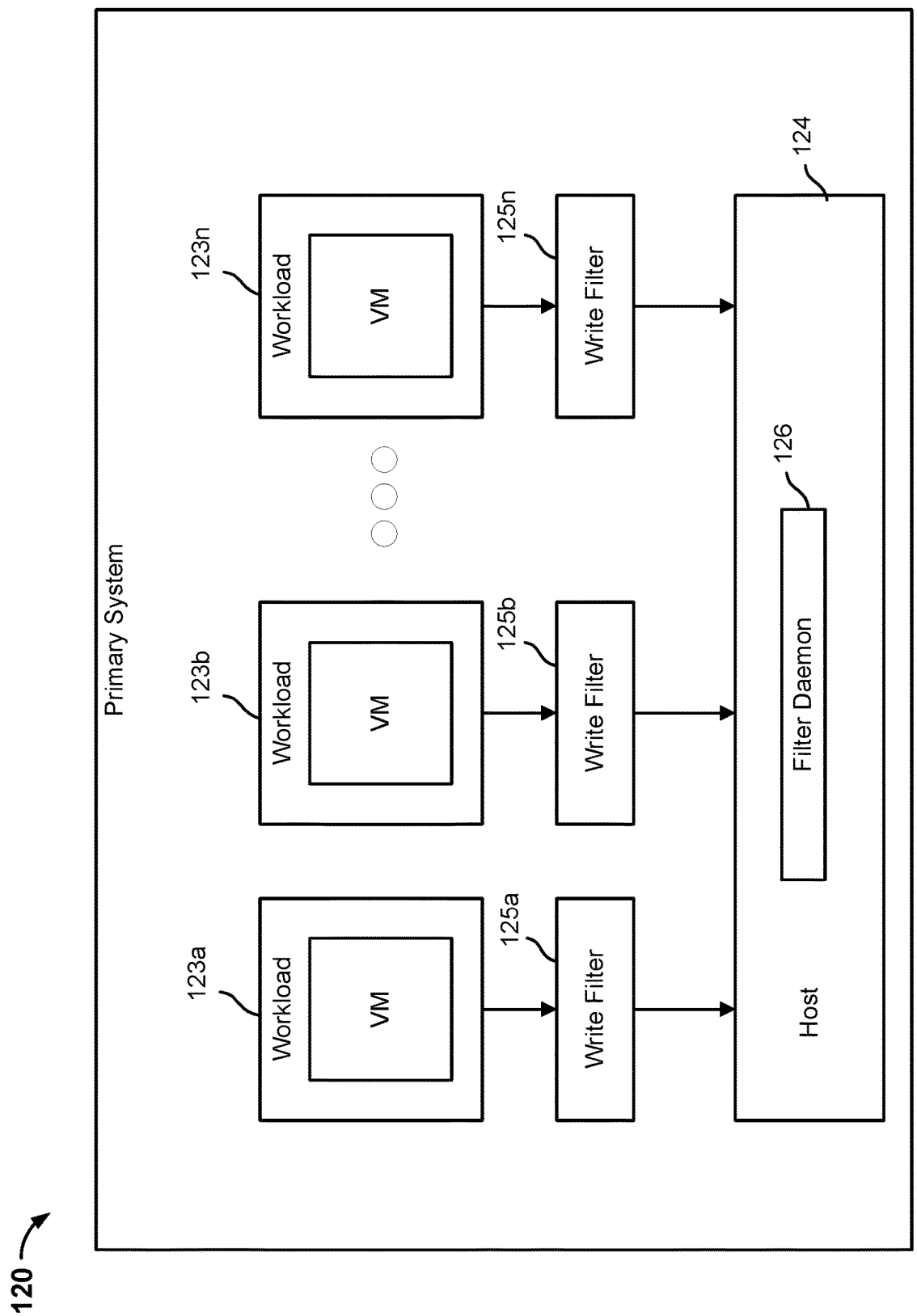

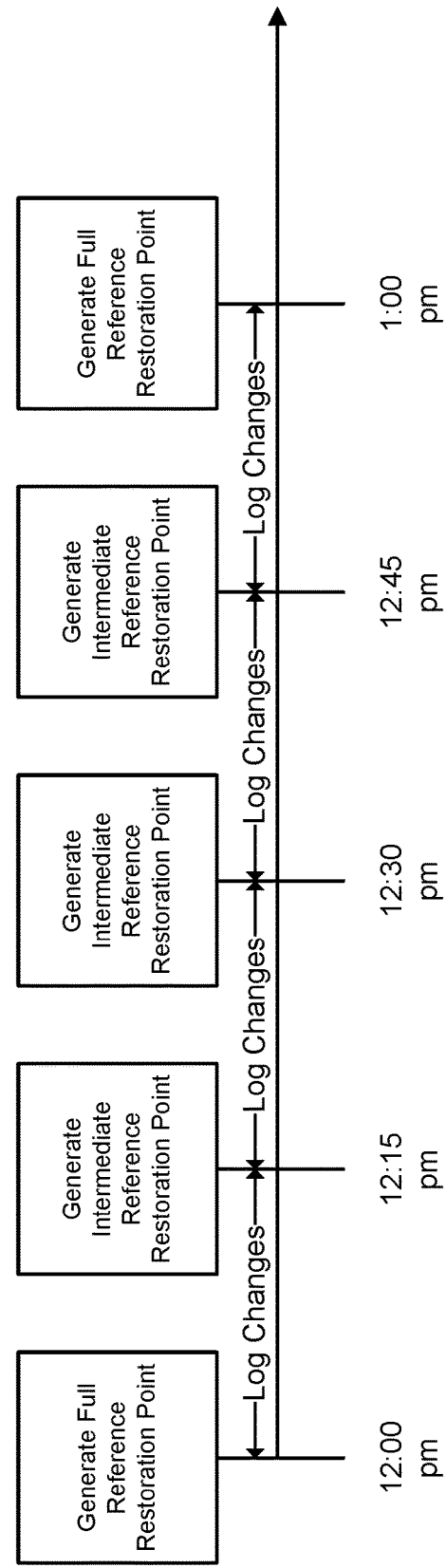

CONTINUOUS DATA PROTECTION USING A WRITE FILTER

CROSS REFERENCE TO OTHER APPLICATIONS

This application claims priority to U.S. Provisional Patent Application No. 62/846,488 entitled NEAR ZERO RECOVERY POINT OBJECTIVE filed May 10, 2019 which is incorporated herein by reference for all purposes.

BACKGROUND OF THE INVENTION

A primary system may back up one or more files to a storage system. The primary system may have an associated recovery point objective (RPO). The RPO is the maximum targeted period in which data might be lost due to a failure of the primary system.

BRIEF DESCRIPTION OF THE DRAWINGS

Various embodiments of the invention are disclosed in the following detailed description and the accompanying drawings.

FIG. 1B is a block diagram illustrating an example of a primary system in accordance with some embodiments.

FIG. 2 is an example of a continuous data protection timeline in accordance with some embodiments.

DETAILED DESCRIPTION

Figure 1A:
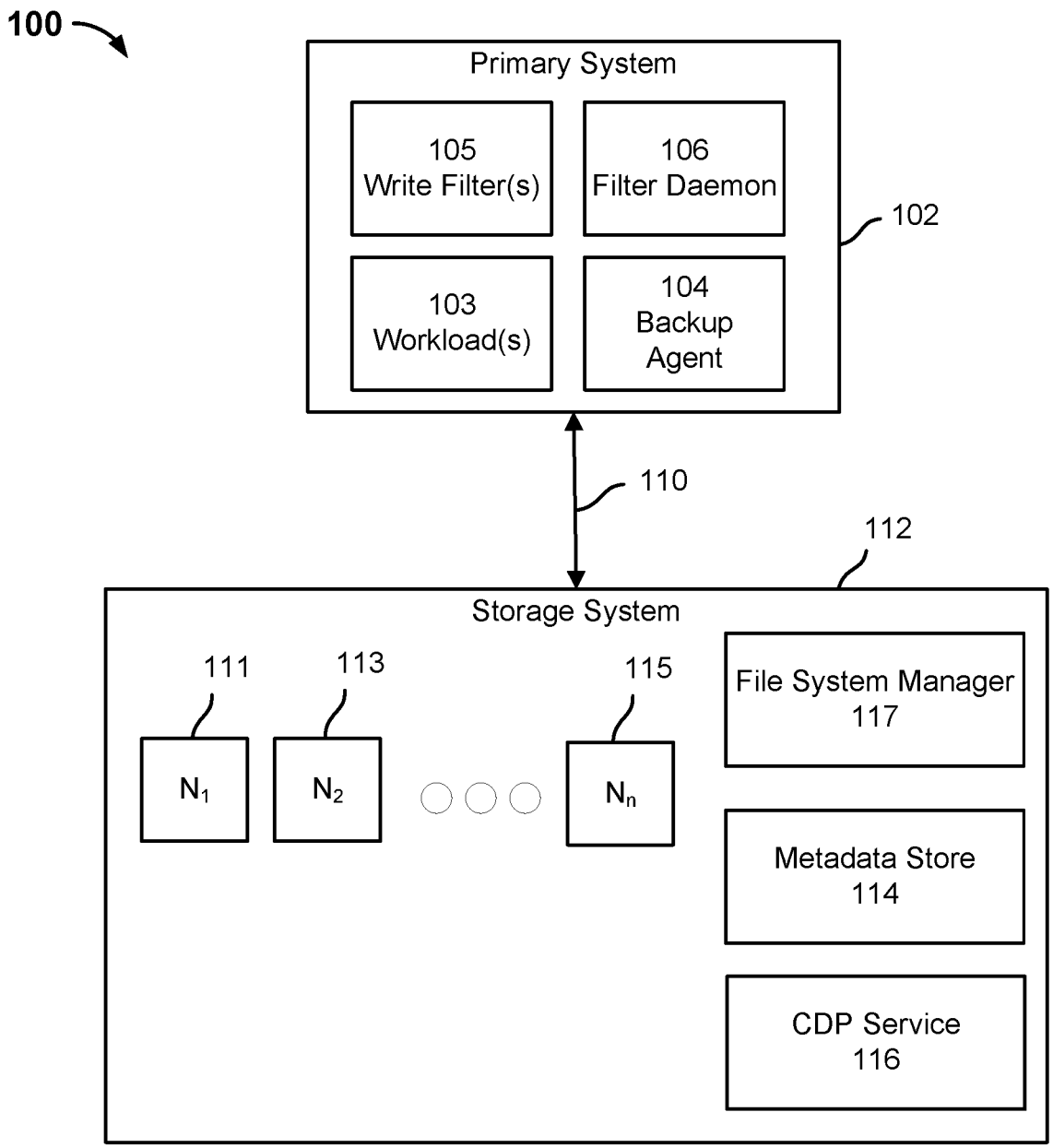
FIG. 1A is a block diagram of a system for providing continuous data protection in accordance with some embodiments.

A primary system may be running one or more workloads (e.g., virtual machine, database, applications, etc.). The primary system may be configured to back up the data associated with the one or more workloads to a storage system. The primary system may be configured to perform a snapshot of the data associated with the one or more workloads according to a snapshot schedule. A user associated with the primary system may configure the snapshot schedule based on an RPO associated with the primary system. The user associated with the primary system may desire to reduce the RPO by increasing a frequency at which snapshots are performed. However, increasing the frequency at which snapshots are performed may reduce a performance associated with the one or more workloads.

At some point in time, the primary system may go offline and need to be restored to a particular point in time. For example, a volume of the primary system may become corrupted. The storage system may provide the primary system, for which there is an associated snapshot, the data associated with the one or more workloads. The primary system may be restored to a point in time corresponding to the associated snapshot. However, the amount of time between the associated snapshot and the point in time at which the primary system started to experience problems may be quite long (e.g., one day). As a result, the primary system may have lost a significant amount of data associated with the one or more workloads.

Continuous data protection (CDP) may increase the rate at which data associated with the one or more workloads is backed up to a storage system without reducing a performance associated with the one or more workloads. CDP may also reduce the amount of data associated with the one or more workloads that is lost as a result of the primary system going offline.

A storage system may be configured to provide CDP for the primary system. The storage system may provide a write filter for each of the one or more workloads. A write filter may be configured to intercept all inputs/outputs (IOs) of an associated workload, filter out the read IOs, and provide a stream of the intercepted write IOs to the storage system. A write filter may be configured to attach a sequence number to each intercepted write IO. The sequence number may include an incarnation ID and a change ID. The incarnation ID may indicate an incarnation of the write filter and may be incremented each time the write filter is restarted after a crash (e.g., workload crash, filter crash). In some embodiments, the incarnation ID is not incremented after a clean restart of a workload. The change ID may be incremented for each intercepted write IO.

In some embodiments, the storage system is configured to provide an IO filter daemon to the primary system. The IO filter daemon may be configured to receive the intercepted write IOs from each of the write filters and to provide the intercepted write IOs from each of the write filters to the storage system.

The storage system may include one or more CDP services that are configured to receive one or more intercepted write IOs from the IO filter daemon of the primary system. Each storage node of the storage system may have a corresponding CDP service. The IO filter daemon may select one of the one or more CDP services and provide the intercepted write IOs associated with a particular workload to the selected CDP service. A CDP service may maintain a log for the one or more intercepted write IOs received from the IO filter daemon of the primary system. Each entry of the log may store the metadata associated with an intercepted write IO. For example, the metadata associated with an intercepted write IO may include at least one of the following: sequence number, timestamp, IO offset, IO length, IO data bytes, VM universally unique identifier (UUID), virtual machine disk (VMDK) full path on a host at which the VM is running, etc.

The primary system may be configured to perform a full snapshot (i.e., a reference snapshot) and to provide the file system data included in the full snapshot to a storage system. A full snapshot may represent the entire state of a single workload at a particular moment in time. The full snapshot may include configuration data associated with a workload. In some embodiments, a full snapshot represents the entire state of the primary system at a particular moment in time and include all of the file system data associated with the primary system. For example, the file system data may include the data associated with all of the workloads hosted by the primary system. The storage system may ingest and store the file system data included in the full snapshot. A file system manager of the storage system may be configured to organize in a tree data structure the file system data included in the full snapshot.

A write filter may be attached to a workload to initiate CDP protection of the workload. The write filter may be attached prior to the full snapshot being initiated. The write filter may be attached at a disk layer of the workload, a file system layer of the workload, or a virtualized layer of the workload. A workload may be associated with one or more disks. A corresponding write filter may be attached to each of the one or more disks. IOs associated with the workload may be intercepted and the intercepted write IOs are provided, via a filter daemon, to a CDP service associated with the storage system. The CDP service may log in a log file the one or more intercepted write IOs. A request to generate a reference restoration point may be issued. A reference restoration point may refer to a full reference restoration point or an intermediate reference restoration point. The reference restoration point may be an app consistent recovery point. In other systems, a reference restoration point may be generated by performing a full snapshot or an incremental snapshot. One limiting factor in the total amount of time needed to perform a snapshot (full or incremental) is the transmission time associated with providing backup data from the primary system to the storage system. However, since the write IOs associated with the workload have already been streamed to a CDP service associated with a storage system, the amount of time needed to generate the reference restoration point is reduced because the write IOs do not need to be transferred after a request to generate a reference restoration point. In some embodiments, a reference restoration point for a particular workload is generated. In other embodiments, a reference restoration point for the primary system that includes one or more workloads is generated.

To initiate the generation of a reference restoration point, the write filter may insert a snapshot marker in the stream of data in between intercepted write IOs. IOs that occur before the snapshot marker are associated with a first reference restoration point. IOs that occur after the snapshot marker are associated with a second reference restoration point.

A CDP service running on the storage system may receive the snapshot marker. The snapshot marker may be stored in an entry of a log associated with the CDP service. A file system manager may inspect the log associated with the CDP service and detect the entry having the snapshot marker. In response to detecting the snapshot marker, the file system manager may clone a tree data structure corresponding to the previous reference restoration point and apply to the cloned tree data structure the one or more log entries in the log that correspond to IOs that occurred after the previous reference restoration point and before the current reference restoration point.

After the one or more IOs associated with the one or more log entries are applied to the cloned tree data structure, a reference restoration point is generated. The generated reference restoration point is a fully hydrated recovery point. A fully hydrated reference restoration point corresponds to a state which may be restored without having to apply one or more logged IOs. For example, a first reference restoration point may be generated at time $t_1$. A primary system or a workload may be restored to a state associated with time $t_1$ by traversing the tree data structure associated with the first reference restoration point, locating the data found by traversing the tree data structure, and providing the located data. A second reference restoration point may be generated at time $t_{10}$. A primary system or a workload may be restored to a state between time $t_1$ and $t_{10}$ by cloning the tree data structure associated with the first reference restoration point, applying one or more data changes that are stored in a log file to the tree data structure associated with the first reference restoration point, traversing the tree data structure, locating the data found by traversing the tree data structure, and providing the located data.

In some embodiments, the CDP service determines a gap in the sequence numbers of the intercepted write IOs associated with a workload. For example, the intercepted write IOs may be missing an IO with a particular change id. In some embodiments, the intercepted write IOs may have a new incarnation ID. This may indicate a problem associated with the workload or the primary system on which the workload resides. In response to determining that a gap exists in the sequence numbers associated with the intercepted write IOs, the CDP service may send to a backup agent running on the primary system a command to perform a full snapshot. In response to receiving the command, the backup agent may cause a full snapshot of the workload to be performed. In some embodiments, in response to receiving the command, the backup agent may cause a full snapshot of the primary system hosting the workload to be performed. The full snapshot of the workload includes all the data associated with a workload. Performing a full snapshot of the workload when detecting a gap in the sequence numbers of the intercepted write IOs associated with a workload may prevent the data associated with a workload from becoming corrupted (e.g., workload data is missing). The full snapshot may also reduce the uncertainty that the storage system does not store all of the write IOs associated with a workload.

The storage system may receive from a primary system a request to restore a workload to any particular moment in time after an initial reference restoration point. The storage system may restore the workload or the primary system to any particular moment in time after the initial reference restoration point was performed because the storage system is configured to store a log of the IOs associated with a workload. The storage system may determine the tree data structure that is closest in time before the requested restoration time. The storage system may clone the determined tree data structure and apply the IOs associated with the requested restoration time to the cloned tree data structure. That is, the storage system may apply to the cloned tree data structure the IOs from the point in time corresponding to the last snapshot to the requested restoration time. After the IOs have been applied to the cloned tree data structure, the storage system may provide the data associated with the modified cloned tree data structure to the primary system.

However, if there is a gap in the stream of IOs, the IOs occurring after the gap (e.g., having a sequence number later than the missing IO) cannot be restored. In the event there is a gap in the stream of IOs, a reference restoration point occurring after the gap may be used.

FIG. 1A is a block diagram of a system for providing continuous data protection in accordance with some embodiments. In the example shown, system 100 is comprised of primary system 102 that is coupled to storage system 112 via connection 110. Connection 110 may be a wired or wireless connection. Connection 110 may be a LAN, WAN, intranet, the Internet, and/or a combination thereof.

Primary system 102 may be comprised of one or more workloads 103, a backup agent 104, one or more write filters 105, and a filter daemon 106. Primary system 102 may be configured to run one or more workloads 103. Examples of workloads include, but are not limited to, a virtual machine, a database, an application, a container, a pod, etc. Primary system 102 may include one or more storage volumes (not shown) that are configured to store file system data associated with primary system 102. The file system data associated with primary system 102 includes the data associated with the one or more workloads 103.

Backup agent 104 may be configured to cause primary system 102 to perform a reference snapshot (e.g., a full snapshot). A full snapshot may include all of the file system data of primary system 102 at a particular moment in time. In some embodiments, a full snapshot includes all of the workload data associated with one of the one or more workloads 103 at a particular moment in time. In some embodiments, backup agent 104 is running on primary system 102. In some embodiments, backup agent 104 is running in one of the one or more workloads 103. In some embodiments, a backup agent 104 is running on primary system 102 and a separate backup agent 104 is running in one of the one or more workloads 103.

Storage system 112 may receive the file system data included in a reference snapshot and generate a view of the file system data. In some embodiments, a view of the file system data corresponding to the reference snapshot is generated for primary system 102. In some embodiments, a view of the workload data corresponding to the reference snapshot is generated for one of the one or more workloads 103.

File system manager 117 may be configured to organize in a tree data structure the file system data and/or workload data included in the reference snapshot. An example of the tree data structure is a snapshot tree, which may be based on a B+ tree structure (or other type of tree structure in other embodiments). In the event the reference snapshot corresponds to all of the file system data of primary system 102, the view corresponding to the reference snapshot may be comprised of a snapshot tree and one or more workload metadata structures. The snapshot tree may be configured to store the metadata associated with primary system 102. A workload metadata structure may be configured to store the metadata associated with one of the one or more workloads 103. Each of the one or more workloads 103 may have a corresponding metadata structure. In some embodiments, the data associated with a workload is greater than a size threshold. In the event the data associated with the workload is greater than the size threshold, the metadata associated with a workload may be stored across a plurality of workload metadata structures.

In the event the reference snapshot corresponds to all of the workload data of one of the one or more workloads 103, the view corresponding to the reference snapshot may be comprised of a snapshot tree and one or more workload file metadata structures. The snapshot tree may be configured to store the metadata associated with one of the one or more workloads 103. A workload file metadata structure may be configured to store the metadata associated with a workload file included in the workload.

The tree data structure may be used to capture different reference restoration points. The tree data structure allows a chain of reference restoration points to be linked together by allowing a node of a later version of a snapshot tree associated with an intermediate reference restoration point to reference a node of a previous version of a snapshot tree. The previous version of the snapshot tree may correspond to an earlier intermediate reference restoration point or an earlier full reference restoration point. For example, a root node or an intermediate node of a snapshot tree corresponding to the later reference restoration point may reference an intermediate node or leaf node of a snapshot tree corresponding to the earlier reference restoration point.

A snapshot tree is a representation of a fully hydrated restoration point because it provides a complete view of a primary system or a workload at a particular moment in time. A fully hydrated restoration point is a restoration point that is ready for use without having to reconstruct a plurality of backups to use it. Instead of reconstructing a restoration point by starting with a full backup and applying one or more data changes associated with one or more incremental backups to the data associated with the full backup, storage system 112 maintains fully hydrated restoration points. Any file associated with primary system 102 or a workload at a particular time and the file's contents, for which there is an associated reference restoration point, may be determined from the snapshot tree, regardless if the associated reference restoration was a full reference restoration point or an intermediate reference restoration point.

A snapshot tree may include a root node, one or more levels of one or more intermediate nodes associated with the root node, and one or more leaf nodes associated with an intermediate node of the lowest intermediate level. The root node of a snapshot tree may include one or more pointers to one or more intermediate nodes. Each intermediate node may include one or more pointers to other nodes (e.g., a lower intermediate node or a leaf node). A leaf node may store file system metadata, data associated with a file that is less than a limit size, an identifier of a data brick, a pointer to a metadata structure (e.g., workload metadata structure or a workload file metadata structure), a pointer to a data chunk stored on the storage cluster, node reservation information, file offset information associated with a combined metadata structure, etc.

A metadata structure (e.g., workload file metadata structure or workload metadata structure) may include a root node, one or more levels of one or more intermediate nodes associated with the root node, and one or more leaf nodes associated with an intermediate node of the lowest intermediate level. The tree data structure associated with a metadata structure allows a chain of metadata structures corresponding to different versions of a workload or a workload file to be linked together by allowing a node of a later version of a metadata structure to reference a node of a previous version of a metadata structure.

A metadata structure may be associated with a plurality of chunk files. A chunk file may be comprised of a plurality of data chunks. Metadata store 114 may store one or more metadata structures. In some embodiments, a metadata structure corresponds to a workload. In other embodiments, a metadata structure corresponds to a workload file. In other embodiments, a metadata structure corresponds to a portion of a workload. In other embodiments, a metadata structure corresponds to a portion of a workload file.

A leaf node of a metadata structure may store a value, such as an identifier of a data brick associated with one or more data chunks. The location of the one or more data chunks associated with a data brick may be identified using one or more data structures (e.g., list, table, etc.) stored in metadata store 114. A first data structure (e.g., chunk metadata table) may store information that associates a brick identifier with one or more chunk identifiers and one or more chunk file identifiers. A second data structure (e.g., chunk file metadata table) may associate a chunk file identifier with a chunk file storing a plurality of data chunks. In some embodiments, the first data structure and the second data structure are combined as a single data structure. The one or more data chunks associated with a data brick may be located based on the chunk metadata table and the chunk file metadata table. For example, a first data brick having a first brick identifier may be associated with a first chunk identifier (e.g., SHA-1 hash value). The first chunk identifier may be used in conjunction with the chunk metadata table to identify a chunk file identifier. A chunk file having the identified chunk file identifier is comprised of a plurality of data chunks. The chunk file metadata table may be used to identify a location of the plurality of data chunks. The chunk file metadata table may include offset information of the plurality of data chunks within a chunk file.

One or more write filters 105 may be attached to the one or more workloads 103 prior to a reference snapshot (e.g., full snapshot) of primary system 102 being initiated to provide CDP for the workload to which a write filter is attached. The write filter may be attached at a disk layer of the workload (e.g., disk write filter), a file system layer of the workload (e.g., file system write filter), or a virtualized layer of the workload (e.g., virtualized write filter). A workload may be associated with one or more disks. A corresponding write filter may be attached to each of the one or more disks. A disk may be associated with one or more write filters.

Each workload of the one or more workloads 103 may be associated with a corresponding write filter. A write filter may be configured to intercept all IOs of an associated workload, filter out the read IOs, and provide a stream of the intercepted write IOs. A write filter may be configured to attach a sequence number to each intercepted write IO. The sequence number may include an incarnation ID and a change ID. The incarnation ID may indicate an incarnation of the write filter and may be incremented each time the write filter is restarted after a crash (e.g., workload crash, filter crash). In some embodiments, the incarnation ID is not incremented after a clean restart of a workload. The change ID may be incremented for each intercepted write IO. For example, the sequence number may be represented as [incarnation ID, change ID]. The sequence number may be [0, 0], [0, 1] . . . [0, n]. In the event the write filter goes offline after a crash and comes back online, the incarnation ID may be incremented such that the sequence numbers attached to the intercepted write IOs may be [1, 0], [1, 1] . . . [1,n].

The one or more write filters 105 may be configured to provide their corresponding intercepted write IOs to filter daemon 106. Filter daemon 106 may be configured to collect the intercepted write IOs from the plurality of write filters 105 and stream the intercepted write IOs to storage system 112. In some embodiments, filter daemon 106 streams the intercepted write IOs as they are received. In some embodiments, filter daemon 106 is configured to stream batches of intercepted write IOs. Filter daemon 106 may be configured to cache the received intercepted write IOs until they are provided to storage system 112.

Filter daemon 106 may be configured to provide the intercepted write IOs associated with a particular workload of the one or more workloads 103 to a particular storage node of storage nodes 111, 113, 115. The number of available storage nodes may increase (e.g., a node is added to storage system 112) or decrease (e.g., a node is offline). A particular storage node may be assigned to a particular workload. Filter daemon 106 may determine a workload_ID associated with a workload and stream the intercepted write IOs associated with the workload_ID to a storage node assigned to a workload having the workload_ID. The particular storage node may be selected from the set of available storage nodes based on one or more factors, such as availability of a CDP service associated with a storage node.

Filter daemon 106 may be configured to stream the intercepted write IOs associated with a plurality of workloads to corresponding storage nodes of storage nodes 111, 113, 115. For example, filter daemon 106 may be configured to stream the intercepted write IOs associated with a first workload to storage node 111, the intercepted write IOs associated with a second workload to storage node 113, . . . , and the intercepted write IOs associated with an nth workload to storage node 115. The intercepted write IOs associated with a plurality of workloads may be streamed in parallel. In some embodiments, the intercepted write IOs associated with a plurality of workloads are streamed sequentially. In some embodiments, the intercepted write IOs associated with a workload are streamed to a plurality of storage nodes.

In some embodiments, the intercepted write IOs associated with a particular workload are grouped into a plurality of sets, e.g., a first set of intercepted write IOs, a second set of intercepted write IOs, . . . , and an nth set of intercepted write IOs. The different sets of IOs may be provided to different nodes of storage nodes 111, 113, 115. For example, the first set of intercepted write IOs associated with the particular workload may be provided to storage node 111, the second set of intercepted write IOs associated with the particular workload may be provided to storage node 113, . . . , and the nth set of intercepted write IOs associated with the particular workload may be provided to storage node 115. The intercepted write IOs associated with the plurality of sets may be streamed in parallel. In some embodiments, the intercepted write IOs associated with the plurality of sets are streamed sequentially.

Backup agent 104 may cause primary system 102 to perform an incremental snapshot. An incremental snapshot usually includes the data that was not previously backed up. However, the one or more write filters 105 and filter daemon 106 are configured to provide CDP for the one or more workloads 103. Thus, a stream of data associated with the one or more workloads 103 is continuously being provided from primary system 102 to storage system 112. Instead of providing a command to perform an incremental snapshot, backup agent 104 may provide to a workload a command to generate an intermediate reference restoration point. Instead of performing the incremental backup snapshot, a write filter may intercept the command as it is being provided to the workload and attach a snapshot marker to the IO. The snapshot marker indicates a time at which an intermediate reference restoration point associated with the workload was requested. The snapshot marker provides an intermediate reference restoration point, which may be used to identify a version of a workload to be used to restore the workload to a particular point in time.

In some embodiments, an application associated with a workload may perform a snapshot of the workload. The snapshot has an associated snapshot ID that is not identified by storage system 112. A snapshot marker has a particular snapshot ID. A snapshot marker corresponding to a snapshot initiated by storage system 112 may have an associated ID that is known to storage system 112. A snapshot marker corresponding to a snapshot initiated by an application associated with the workload may have an associated ID that is unknown to storage system 112. In the event an application associated with a workload performs a snapshot of the workload, the snapshot may not be used as a reference restoration point because the storage system is unaware of a snapshot having the ID that is associated with the application.

Storage system 112 may include a plurality of storage nodes. The storage nodes 111, 113, 115 may include a corresponding processor and a plurality of storage tiers. For example, a first storage tier may be comprised of one or more solid state drives (SSDs) and a second storage tier may be comprised of one or more hard disk drives (HDDs). The storage associated with the first storage tier may have faster access times than the storage associated with one or more other storage tiers. In some embodiments, storage system 112 is comprised of one or more virtual storage nodes that are operating in a cloud environment (e.g., public cloud, private cloud). Each virtual storage node has a corresponding amount of storage.

Storage system 112 may include CDP Service 116. In some embodiments, storage nodes 111, 113, 115 each have a corresponding CDP Service. In other embodiments, storage system 112 has a single CDP service that is running on one of the storage nodes 111, 113, 115. CDP Service 116 may be configured to receive one or more intercepted write IOs from filter daemon 106. Filter daemon 106 may assign a particular CDP Service 116 for a particular workload. CDP Service 116 may have an associated cache. In response to receiving the one or more intercepted write IOs, CDP Service 116 may be configured to store in the associated cache, the one or more received intercepted write IOs in a log (e.g., write-ahead-log). CDP Service 116 may be configured to store a corresponding log per workload. In some embodiments, CDP Service 116 is configured to store a log for a plurality of workloads.

A log may be comprised of one or more entries. An entry may associate an intercepted write IO stored by CDP Service 116 with a sequence number. In some embodiments, an entry associates the intercepted write IO stored by CDP Service 116 with a sequence number and a snapshot marker. File system manager 117 may determine that the log includes an entry with a snapshot marker. In response to determining that the log includes an entry with a snapshot marker, file system manager 117 may generate a reference restoration point by updating a tree data structure corresponding to the workload to be restored. In some embodiments, a snapshot tree corresponding to a workload is cloned and the one or more entries included in the log are applied to the cloned snapshot tree. In some embodiments, a workload metadata structure is cloned and the one or more entries included in the log are applied to the cloned workload metadata structure. Each entry that includes a snapshot marker corresponds to a fully hydrated reference restoration point.

In some embodiments, file system manager 117 may detect a gap in a sequence of IOs associated with a workload. For example, file system manager 117 may detect that an incarnation ID associated with a write filter attached to a workload has incremented. File system manager 117 may detect that a change ID has been skipped. In response to detecting a gap in the sequence of IOs associated with a workload, file system manager 117 may provide to backup agent 104 a notification of the gap. In response to receiving the notification, backup agent 104 may cause a reference snapshot of the affected workload to be performed. In some embodiments, in response to receiving the notification, backup agent 104 may cause a reference snapshot of primary system 102. This ensures that the data associated with a workload that is backed up to storage system 112 is not corrupt because the workload data is missing data.

FIG. 1B is a block diagram illustrating an example of a primary system in accordance with some embodiments. In the example shown, primary system 120 is comprised of a first workload 123a, a second workload 123b, . . . , and an nth workload 123n. Each workload may be a different VM. Although FIG. 1B depicts a workload as a VM, primary system 120 may host different workloads, such as a database, an application, a container, a pod, etc. Each workload is associated with a corresponding write filter. For example, workload 123a is associated with write filter 125a, workload 123b is associated with write filter 125b, and workload 123n is associated with write filter 125n. A write filter may be coupled (e.g., attached) to a corresponding workload prior to an initial reference snapshot (e.g., full snapshot) of the workload being initiated. A write filter may be configured to intercept IOs associated with the workload to which the write filter is coupled. A write filter may include a sequence number with the intercepted write IO. In some embodiments, a write filter includes a snapshot marker in between a stream of intercepted IOs. A write filter may be configured to provide an intercepted write IO to filter daemon 126.

Primary system 120 may include a host 124 (e.g., hypervisor) that includes filter daemon 126. Filter daemon 126 may be configured to collect the intercepted write IOs and/or snapshot marker(s) provided by write filters 125a, 125b, 125n. Filter daemon 126 may be configured to stream to a storage system the intercepted write IOs and/or snapshot marker(s) as they are received. In other embodiments, filter daemon 126 is configured to stream to the storage system batches of intercepted write IOs and/or snapshot marker(s).

In some embodiments, filter daemon 126 streams the intercepted write IOs associated with a particular workload to a specific storage node of the storage system. In some embodiments, filter daemon 126 streams the intercepted write IOs associated with a particular workload to a plurality of storage nodes of the storage system.

Figure 1C:
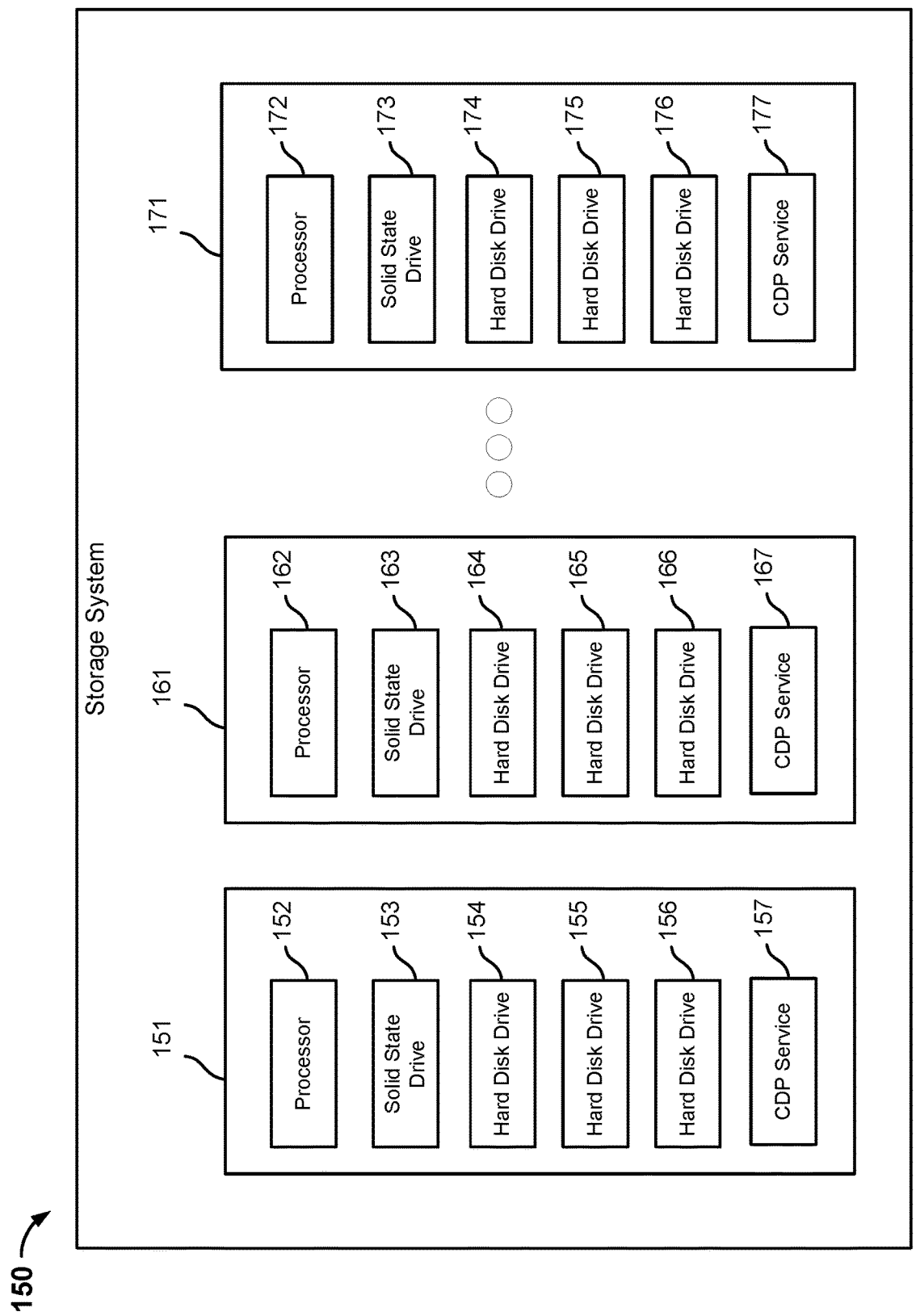
FIG. 1C is a block diagram illustrating an example of a storage system in accordance with some embodiments.

FIG. 1C is a block diagram illustrating an example of a storage system in accordance with some embodiments. Storage system 150 includes a first storage node 151, a second storage node 161, . . . , and an nth storage node 171. Each storage node has a corresponding processor, a corresponding CDP service, and a plurality of storage tiers. A first storage tier may correspond to a storage with faster access times than a second storage tier. IN the example shown, a first storage tier corresponds to a solid state drive and a second storage tier corresponds to a hard disk drive.

Storage node 151 includes processor 152, solid state drive 153, hard disk drives 154, 155, 156, and CDP service 157. Storage node 161 includes processor 162, solid state drive 163, hard disk drives 164, 165, 166, and CDP service 167. Storage node 171 includes processor 172, solid state drive 173, hard disk drives 174, 175, 176, and CDP service 177.

Storage system 150 may receive a reference snapshot (e.g., full snapshot) from a primary system. The data included in the reference snapshot may be stored in one of the storage nodes 151, 161, 171. In some embodiments, the data included in the reference snapshot is stored across the storage nodes 151, 161, 171. The data included in the reference snapshot may be stored in a first storage tier (e.g., solid state drives 153, 163, 173), a second storage tier (e.g., hard disk drives 154, 155, 156, 164, 165, 166, 174, 175, 176), or a combination of a first storage tier and a second storage tier.

Storage system 150 may include a file system manager that is configured to organize the data included in the reference snapshot. In some embodiments, a file system manager is running on one of the storage nodes 151, 161, 171. In some embodiments, each storage node has its own corresponding file system manager. The file system manager may organize the data included in the reference snapshot using a tree data structure. The tree data structure may be configured to store the metadata associated with a primary system. In some embodiments, the tree data structure is configured to store the metadata associated with a workload. The tree data structure and the metadata may be stored in a metadata store. The metadata store may be distributed across the storage nodes 151, 161, 171. Solid state drives 153, 163, 173 may each store a portion of the metadata store.

Each CDP Service may have a corresponding log. CDP Services 157, 167, 177 may receive a corresponding stream of IOs from a filter daemon, such as filter daemon 126, and store a record of the IO in its corresponding log. The data associated with an IO may be stored in a storage associated with the CDP Service (e.g., a solid state drive, a hard disk drive, a cache, etc.). A log may include one or more entries. In some embodiments, the log stores one or more entries for a particular workload. In some embodiments, the log stores entries for a plurality of workloads. In some embodiments, a CDP service has a plurality of logs, each log corresponding to a particular workload.

An entry of the log may associate a particular IO with a timestamp and a sequence number. In some embodiments, the entry of the log associates a particular IO with a timestamp, a sequence number, and a snapshot marker. The snapshot marker indicates that a reference restoration point is to be generated.

FIG. 2 is an example of a continuous data protection timeline in accordance with some embodiments. In the example shown, continuous data protection timeline 200 illustrates reference restoration points are generated at 12:00 pm, 12:15 pm, 12:30 pm, 12:45 pm, and 1:00 pm. Reference restoration points may be generated based on a backup policy. In some embodiments, the backup policy indicates that reference restoration points are to be generated periodically (e.g., every 15 minutes, every 30 minutes, every 60 minutes, etc.). In some embodiments, the backup policy indicates that reference restoration points are to be generated in response to a user command. In some embodiments, the backup policy indicates that reference restoration points are to be generated after a threshold number of data changes have been logged. In some embodiments, the backup policy indicates that a reference restoration point is to be generated in the event a gap is detected in the sequenced of logged IOs.

In the example shown, at 12:00 pm, a full reference restoration point is generated. A full reference restoration point may correspond to a full backup snapshot. A full backup snapshot may include all of the file system data associated with a primary system comprised of one or more workloads. File system data may be ingested and stored by a storage system. The storage system may include a file system manager that is configured to organize the file system data in a tree data structure. The tree data structure may be comprised of a snapshot tree and one or more metadata structures. A metadata structure may be a workload metadata structure that corresponds to one of the one or more workloads hosted on the primary system.

In some embodiments, the full backup snapshot includes all of the workload data associated with a workload. Workload data may be ingested and stored by a storage system. The storage system may include a file system manager that is configured to organize the workload data in a tree data structure. The tree data structure may be comprised of a snapshot tree and one or more metadata structures. A metadata structure may be a workload file metadata structure that corresponds to one of the files associated with the workload.

Between 12:00 pm and 12:15 pm, a write filter may be configured to stream intercepted write IOs to a CDP service of the storage system. The intercepted write IOs are associated with one or more workloads. In response to receiving the intercepted write IOs, the CDP service may log the intercepted write IOs.

At 12:15 pm, an intermediate reference restoration point is generated. The intermediate reference restoration point may be generated by cloning a tree data structure associated with a previous reference restoration point and applying the logged IOs to the cloned tree data structure. In this example, the previous app consistent recovery point corresponds to a full reference restoration point. The intermediate reference restoration point may be generated by cloning a root node of a tree data structure associated with the previous reference restoration point. In some embodiments, the root node of a snapshot tree associated with the previous reference restoration point is cloned. In some embodiments, the root node of a metadata structure associated with the previous reference restoration point (workload metadata structure or workload file metadata structure) is cloned. The cloned tree data structure may be updated, as described herein, based on the logged IOs. The logged IOs that are applied to the tree data structure associated with the previous reference restoration point are the IOs that are logged between 12:00 pm and 12:15 pm.

Between 12:15 pm and 12:30 pm, a write filter may be configured to stream intercepted write IOs to a CDP service of the storage system. The intercepted write IOs are associated with a workload. In response to receiving the intercepted write IOs, the CDP service may log the intercepted write IOs.

At 12:30 pm, an intermediate reference restoration point is generated. The intermediate reference restoration point may be generated by cloning a tree data structure associated with a previous reference restoration point (e.g., 12:15 pm) and applying the logged IOs to the cloned tree data structure. In this example, the previous reference restoration point corresponds to an intermediate reference restoration point. The intermediate reference restoration point may be generated by cloning a root node of a tree data structure associated with the previous reference restoration point. In some embodiments, the root node of a snapshot tree associated with the previous reference restoration point is cloned. In some embodiments, the root node of a metadata structure associated with the previous reference restoration point (workload metadata structure or workload file metadata structure) is cloned. The cloned tree data structure may be updated, as described herein, based on the logged IOs. The logged IOs that are applied to the tree data structure associated with the previous app consistent recovery point are the IOs that are logged between 12:15 pm and 12:30 pm.

Between 12:30 pm and 12:45 pm, intercepted write IOs are logged by a CDP service and at 12:45 pm, an intermediate reference restoration point is generated. The intermediate reference restoration point may be generated in the same manner as described with respect to 12:30 pm.

Between 12:45 pm and 1:00 pm, intercepted write IOs are logged by a CDP service. A file system manager may inspect the log and determine that a gap exists in the sequence numbers associated with the entries that were logged between 12:45 pm and 1:00 pm. In response to detecting a gap, the file system manager may send to a backup agent of the primary system a command to generate a full reference restoration point. In response to receiving the command, the backup agent may cause the primary system to perform a reference snapshot.

Figure 3A:
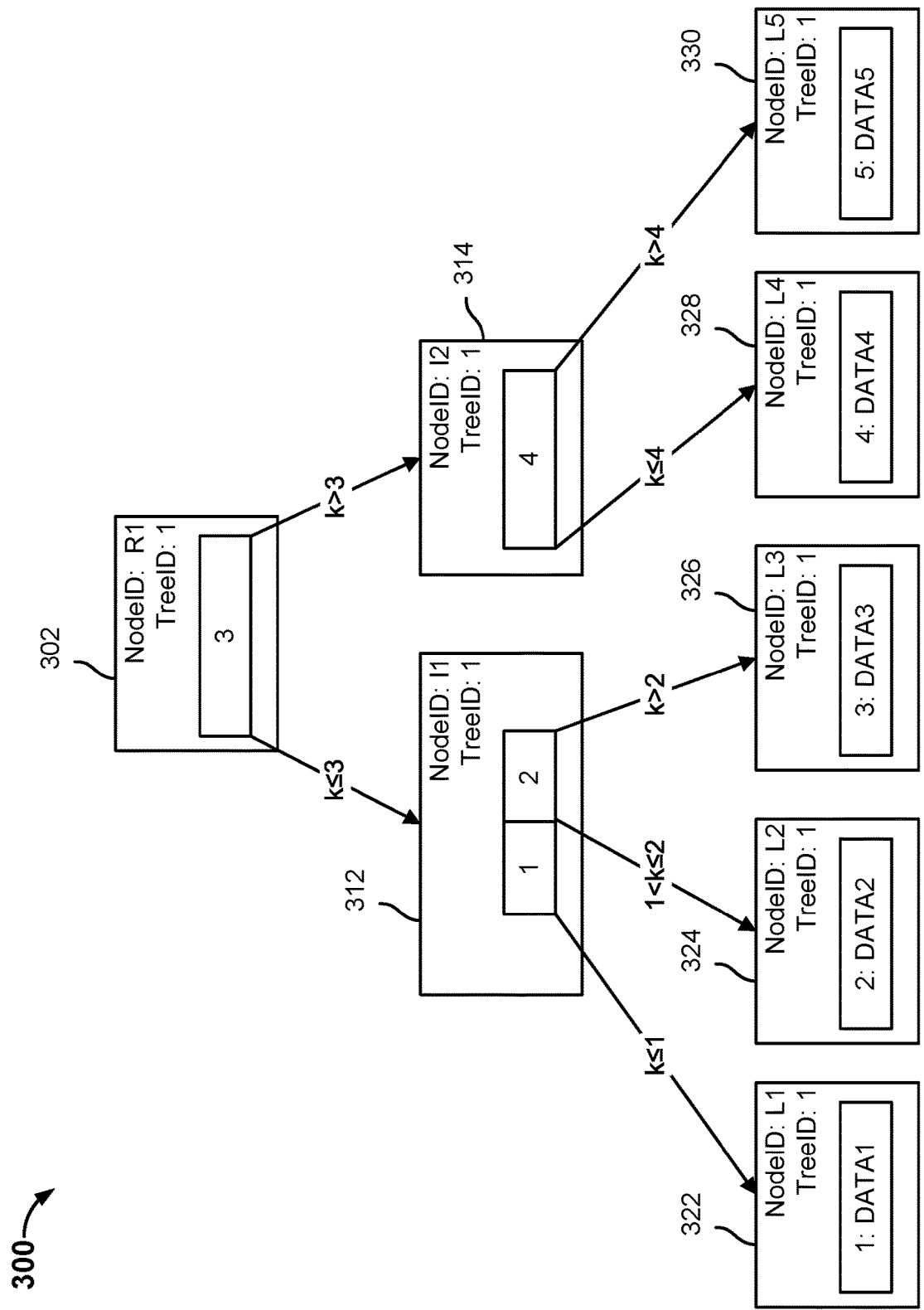
FIG. 3A is a block diagram illustrating an embodiment of a tree data structure.

FIG. 3A is a block diagram illustrating an embodiment of a tree data structure. A tree data structure may be used to represent the file system data that is stored on a storage system, such as storage system 112. In some embodiments, a tree data structure is used to represent the workload data associated with a workload that is stored on the storage system. A storage system may receive from a primary system data associated with a plurality of IOs and store the data. A file system manager, such as file system manager 117, may organize the received data in a tree data structure, such as tree data structure 300. In the example shown, tree data structure 300 corresponds to a snapshot tree. In some embodiments, tree data structure 300 is configured to store the file system metadata associated with a primary system. In some embodiments, tree data structure 300 is configured to store the workload metadata associated with a workload. Tree data structure 300 may correspond to a reference snapshot, e.g., a full backup snapshot.

Tree data structure 300 is comprised of a snapshot tree that includes a root node 302, intermediate nodes 312, 314, and leaf nodes 322, 324, 326, 328, and 330. Although tree data structure 300 includes one intermediate level between root node 302 and leaf nodes 322, 324, 326, 328, 330, any number of intermediate levels may be implemented. Tree data structure 300 may correspond to a snapshot of file system data or workload data at a particular point in time t. The snapshot tree depicted in FIG. 3A may correspond to a reference restoration point (e.g., full reference restoration point) at time $t_1$. The snapshot may be received from a primary system, such as primary system 102. The snapshot tree in conjunction with a plurality of workload metadata structures may provide a complete view of the primary system associated with the snapshot for the particular point in time. In some embodiments, the snapshot tree in conjunction with a plurality of workload file metadata structures may provide a complete view of the workload associated with the snapshot for the particular point in time.

A root node is the starting point of a snapshot tree and may include pointers to one or more other nodes. An intermediate node is a node to which another node points (e.g., root node, other intermediate node) and includes one or more pointers to one or more other nodes. A leaf node is a node at the bottom of a snapshot tree. Each node of the tree structure includes a view identifier of a view with which the node is associated (e.g., TreeID).

A leaf node may be configured to store key-value pairs. A data key k is a lookup value by which a particular leaf node may be accessed. For example, "1" is a data key that may be used to look up "DATA1" of leaf node 322. The data key k may correspond to a brick number of a data brick. A data brick may be comprised of one or more data blocks. In some embodiments, the leaf node is configured to store a brick identifier, file system metadata, workload metadata, file size, directory structure, file permissions, physical storage locations of the files, etc. A leaf node may store a data key k and a pointer to a location that stores the value associated with the data key. A leaf node may store a pointer to a root node of a metadata structure (e.g., workload metadata structure or a workload file metadata structure).

A root node or an intermediate node may include one or more node keys. The node key may be an integer value or a non-integer value. Each node key indicates a division between the branches of the node and indicates how to traverse the tree data structure to find a leaf node, i.e., which pointer to follow. For example, root node 302 may include a node key of "3." A data key k of a key-value pair that is less than or equal to the node key is associated with a first branch of the node and a data key k of a key-value pair that is greater than the node key is associated with a second branch of the node. In the above example, to find a leaf node storing a value associated with a data key of "1," "2," or "3," the first branch of root node 302 may be traversed to intermediate node 312 because the data keys of "1," "2," and "3" are less than or equal to the node key "3." To find a leaf node storing a value associated with a data key of "4" or "5," the second branch of root node 302 may be traversed to intermediate node 314 because data keys "4" and "5" are greater than the node key of "3."

A data key k of a key-value pair is not limited to a numerical value. In some embodiments, non-numerical data keys may be used for a data key-value pair (e.g., "name," "age," etc.) and a numerical number may be associated with the non-numerical data key. In some embodiments, a hash function may be associated with the non-numerical data key. The hash function may determine which branch of a node with which the non-numerical data key is associated. The hash function is applied to a data key to provide a hash. The hash may determine which branch of a node with which the non-numerical data key is associated.

In the example shown, root node 302 includes a pointer to intermediate node 312 and a pointer to intermediate node 314. Root node 302 includes a NodeID of "R1" and a TreeID of "1." The NodeID identifies the name of the node. The TreeID identifies the view with which the node is associated. When a change is made to data stored in a leaf node as described with respect to FIGS. 3B, 3C, and 3D, the TreeID is used to determine whether a copy of a node is to be made.

Root node 302 includes a node key that divides a set of pointers into two different subsets. Leaf nodes (e.g., "1-3") with a data key k that is less than or equal to the node key are associated with a first branch and leaf nodes (e.g., "4-5") with a data key k that is greater than the node key are associated with a second branch. Leaf nodes with a data key of "1," "2," or "3" may be found by traversing tree data structure 300 from root node 302 to intermediate node 312 because the data keys have a value that is less than or equal to the node key. Leaf nodes with a data key of "4" or "5" may be found by traversing tree data structure 300 from root node 302 to intermediate node 314 because the data keys have a value that is greater than the node key.

Root node 302 includes a first set of pointers. The first set of pointers associated with a data key less than the node key (e.g., "1," "2," or "3") indicates that traversing tree data structure 300 from root node 302 to intermediate node 312 may lead to a leaf node with a data key of "1," "2," or "3." Intermediate node 314 includes a second set of pointers. The second set of pointers associated with a data key greater than the node key indicates that traversing tree data structure 300 from root node 302 to intermediate node 314 may lead to a leaf node with a data key of "4" or "5."

Intermediate node 312 includes corresponding pointers to leaf nodes 322, 324, 326. Intermediate node 312 includes a NodeID of "I1" and a TreeID of "1." Intermediate node 312 includes a first node key of "1" and a second node key of "2." The data key k for leaf node 322 is a value that is less than or equal to the first node key. The data key k for leaf node 324 is a value that is greater than the first node key and less than or equal to the second node key. The data key k for leaf node 326 is a value that is greater than the second node key. The pointer to leaf node 322 indicates that traversing tree data structure 300 from intermediate node 312 to leaf node 322 may lead to the node with a data key of "1." The pointer to leaf node 324 indicates that traversing tree data structure 300 from intermediate node 312 to leaf node 324 may lead to the node with a data key of "2." The pointer to leaf node 326 indicates that traversing tree data structure 300 from intermediate node 312 to leaf node 326 may lead to the node with a data key of "3."

Intermediate node 314 includes a pointer to leaf node 328 and a pointer to leaf node 330. Intermediate node 314 includes a NodeID of "I2" and a TreeID of "1." Intermediate node 314 includes a node key of "4." The data key k for leaf node 328 is a value that is less than or equal to the node key. The data key k for leaf node 330 is a value that is greater than the node key. The pointer to leaf node 328 indicates that traversing tree data structure 300 from intermediate node 314 to leaf node 328 may lead to the node with a data key of "4." The pointer to leaf node 330 indicates that traversing tree data structure 300 from intermediate node 314 to leaf node 330 may lead to the node with a data key of "5."

Leaf node 322 includes a data key-value pair of "1: DATA1." Leaf node 322 includes NodeID of "L1" and a TreeID of "1." To view the value associated with a data key of "1," tree data structure 300 is traversed from root node 302 to intermediate node 312 to leaf node 322. In some embodiments, leaf node 322 is configured to store metadata associated with a content file. In some embodiments, leaf node 322 is configured to store metadata associated with a workload. In other embodiments, leaf node 322 is configured to store a pointer to a metadata structure (e.g., workload metadata structure, workload file metadata structure).

Leaf node 324 includes a data key-value pair of "2: DATA2." Leaf node 324 includes NodeID of "L2" and a TreeID of "1." To view the value associated with a data key of "2," tree data structure 300 is traversed from root node 302 to intermediate node 312 to leaf node 324. In some embodiments, leaf node 324 is configured to store metadata associated with a content file. In some embodiments, leaf node 324 is configured to store metadata associated with a workload. In other embodiments, leaf node 324 is configured to store a pointer to a metadata structure (e.g., workload metadata structure, workload file metadata structure).

Leaf node 326 includes a data key-value pair of "3: DATA3." Leaf node 326 includes NodeID of "L3" and a TreeID of "1." To view the value associated with a data key of "3," tree data structure 300 is traversed from root node 302 to intermediate node 312 to leaf node 326. In some embodiments, leaf node 326 is configured to store metadata associated with a content file. In some embodiments, leaf node 326 is configured to store metadata associated with a workload. In other embodiments, leaf node 326 is configured to store a pointer to a metadata structure (e.g., workload metadata structure, workload file metadata structure).

Leaf node 328 includes a data key-value pair of "4: DATA4." Leaf node 328 includes NodeID of "L4" and a TreeID of "1." To view the value associated with a data key of "4," tree data structure 300 is traversed from root node 302 to intermediate node 314 to leaf node 328. In some embodiments, leaf node 328 is configured to store metadata associated with a content file. In some embodiments, leaf node 328 is configured to store metadata associated with a workload. In other embodiments, leaf node 328 is configured to store a pointer to a metadata structure (e.g., workload metadata structure, workload file metadata structure).

Leaf node 330 includes a data key-value pair of "5: DATA5." Leaf node 330 includes NodeID of "L5" and a TreeID of "1." To view the value associated with a data key of "5," tree data structure 300 is traversed from root node 302 to intermediate node 314 to leaf node 330. In some embodiments, leaf node 330 is configured to store metadata associated with a content file. In some embodiments, leaf node 330 is configured to store metadata associated with a workload. In other embodiments, leaf node 330 is configured to store a pointer to a metadata structure (e.g., workload metadata structure, workload file metadata structure).

Figure 3B:
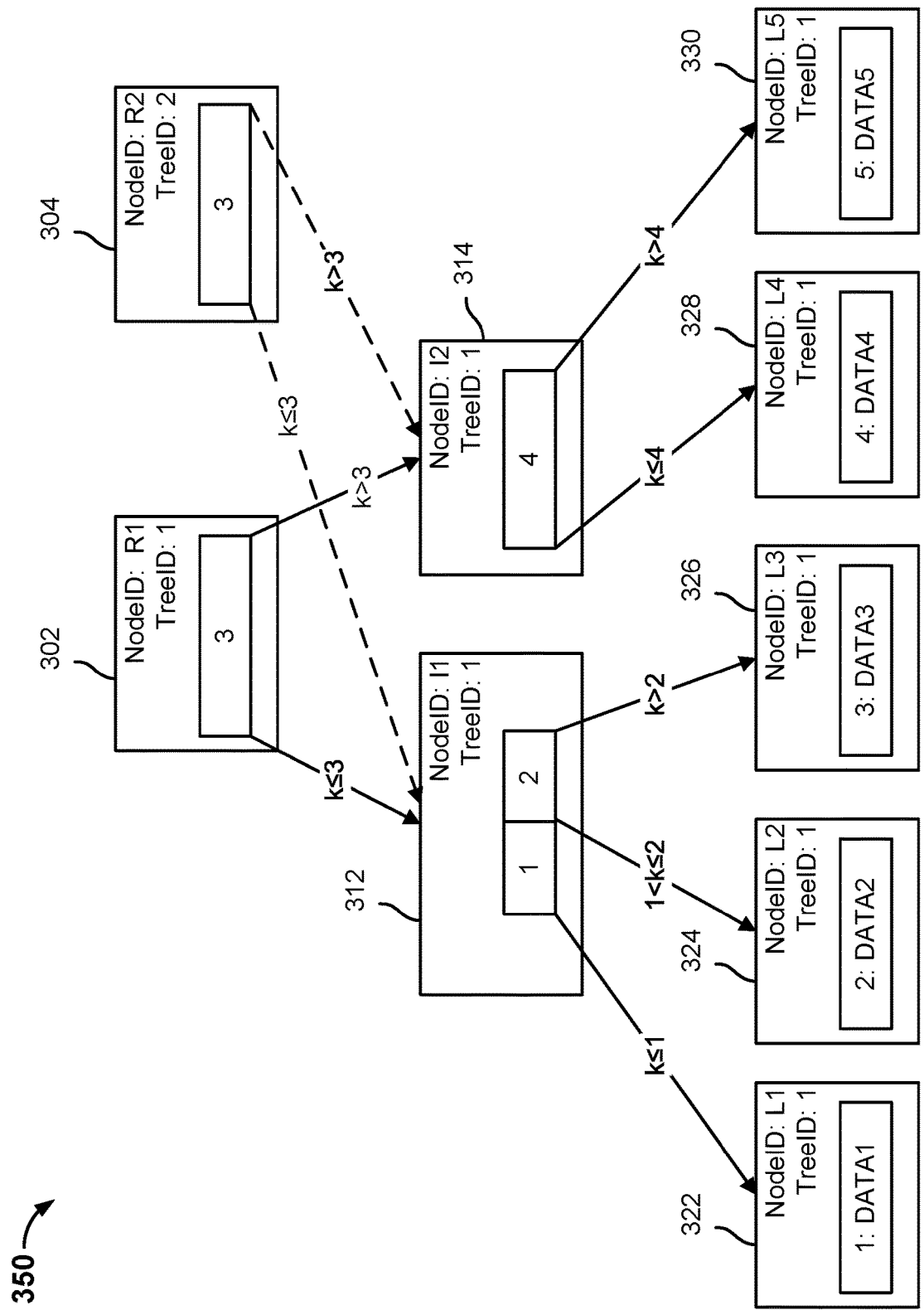
FIG. 3B is a block diagram illustrating an embodiment of a cloned snapshot tree.

FIG. 3B is a block diagram illustrating an embodiment of a cloned snapshot tree. A CDP service may store a log that includes one or more entries. An entry may include a snapshot marker that indicates a reference restoration point is to be generated. A file system manager may detect that an entry includes a snapshot marker. In response to detecting the snapshot marker, the file system manager may be configured to generate a reference restoration point.

A snapshot tree associated with a previous reference restoration point may be cloned to generate the reference restoration point. A snapshot tree may be cloned when a snapshot tree is added to a tree data structure. In some embodiments, tree data structure 350 may be created by a storage system, such as storage system 112. A CDP service of the storage system may store a log for a plurality of intercepted write IOs. The log may be comprised of a plurality of entries. One of the entries may include a snapshot marker, which indicates that a reference restoration point is to be generated. A file system manager of the storage system may detect the snapshot marker. Generating a reference restoration point includes cloning a snapshot tree associated with a previous reference restoration point. In some embodiments, the previous reference restoration point is a full reference restoration point. In some embodiments, the previous reference restoration point is an intermediate reference restoration point.

In the example shown, tree data structure 350 includes root nodes 302, 304, intermediate nodes 312, 314, and leaf nodes 322, 324, 326, 328, and 330. Tree data structure 350 may correspond to a version of file system data at a particular moment in time. In some embodiments, tree data structure 350 corresponds to a version of a workload at a particular moment in time. The tree data structure can be used to capture different versions of file system data/workloads at different moments in time. The tree data structure allows a chain of snapshot trees to be linked together by allowing a node of a later version of a snapshot tree to reference a node of a previous version of a snapshot tree. For example, a snapshot tree with root node 304 is linked to a snapshot tree with root node 302. Each time a reference restoration point is generated, a new root node may be created and the new root node includes the same set of pointers included in the previous root node, that is, the new root node of the snapshot tree may be linked to one or more intermediate nodes associated with a previous snapshot tree. The new root node also includes a different NodeID and a different TreeID. The TreeID may indicate a snapshot to which a node is associated.

In some embodiments, a root node is associated with a current view. A current view may still accept one or more changes to the data. The TreeID of a root node indicates a snapshot with which the root node is associated. For example, root node 302 with a TreeID of "1" is associated with a first reference restoration point and root node 304 with a TreeID of "2" is associated with a second reference restoration point. In the example shown, root node 304 is associated with a current view.

In other embodiments, a root node is associated with a snapshot view. A snapshot view may represent a state of the file system data/workload data at a particular moment in time in the past and is not updated. In the example shown, root node 302 is associated with a snapshot view of the file system data.

In the example shown, root node 304 is a copy of root node 302. Similar to root node 302, root node 304 includes the same pointers as root node 302. However, root node 304 includes a NodeID of "R2" and a TreeID of "2."

Figure 3C:
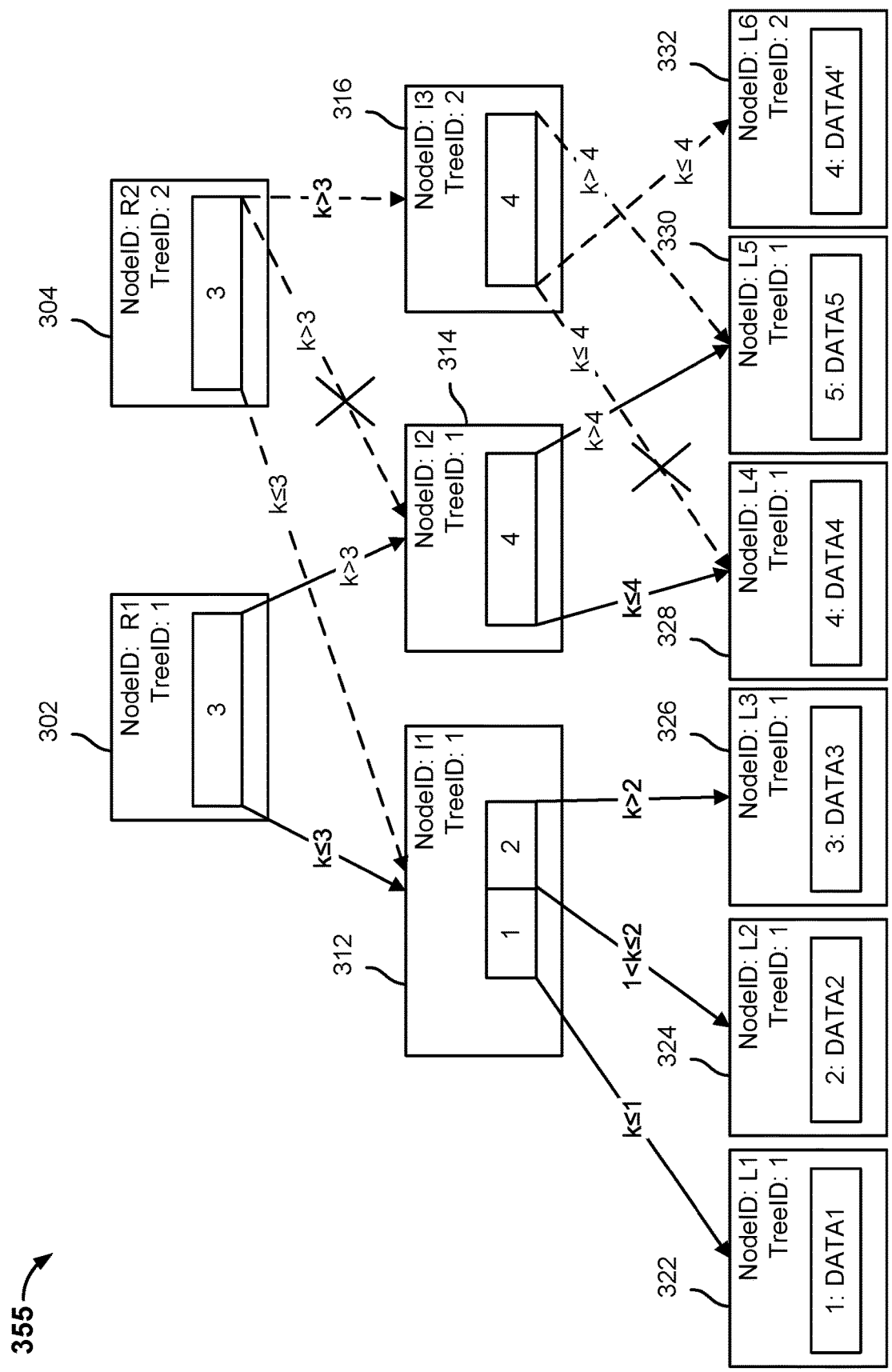
FIG. 3C is a block diagram illustrating an embodiment of modifying a cloned snapshot tree.

FIG. 3C is a block diagram illustrating an embodiment of modifying a cloned snapshot tree. A cloned snapshot tree may be modified to generate a reference restoration point. A CDP service may store a log that includes one or more entries. An entry may be associated with an IO that is intercepted from a workload. The IOs associated with the one or more entries may be applied to the cloned snapshot tree to generate the reference restoration point.

In the example shown, tree data structure 355 may be modified by a file system manager, such as file system manager 117. A snapshot tree with a root node 304 may be a current view of the file system data or workload data. A current view represents a state of the file system data or workload that is up-to-date and capable of receiving one or more modifications to the snapshot tree that correspond to modifications to the file system data or workload. Because a snapshot represents a perspective of the file system data or workload that is "frozen" in time, one or more copies of one or more nodes affected by a change to file system data are made.

The snapshot tree with root node 304 may correspond to a reference restoration point at time $t_{10}$. A file system manager may access a log stored by a CDP service and apply to the cloned snapshot tree, the IOs that occurred after the last reference restoration point and before the snapshot marker associated with a current reference restoration point.

In the example shown, a log entry indicates that the value "DAT A4" has been modified to be "DAT A4'." In some embodiments, the value of a key value pair has been modified. In other embodiments, the value of the key value pair is the data associated with a content file that is smaller than or equal to a limit size. In other embodiments, the value of the key value pair points to a different metadata structure. In some embodiments, the different metadata structure corresponds to a modified version of a workload. In some embodiments, the different metadata structure corresponds to a modified version of a workload file. The different metadata structure may be a modified version of the metadata structure to which the leaf node previously pointed.

The file system manager starts at root node 304 because that is the root node associated with the cloned snapshot tree. The value "DATA4" is associated with the data key "4." The file system manager traverses snapshot tree 355 from root node 304 until it reaches a target node, in this example, leaf node 328. The file system manager compares the TreeID at each intermediate node and leaf node with the TreeID of the root node. In the event the TreeID of a node matches the TreeID of the root node, the file system manager proceeds to the next node. In the event the TreeID of a node does not match the TreeID of the root node, a shadow copy of the node with the non-matching TreeID is made. A shadow copy is a node copy that includes the same pointers as the copied node, but includes a different NodeID and a different TreeID. For example, to reach a leaf node with a data key of "4," the file system manager begins at root node 304 and proceeds to intermediate node 314. The file system manager compares the TreeID of intermediate node 314 with the TreeID of root node 304, determines that the TreeID of intermediate node 314 does not match the TreeID of root node 304, and creates a copy of intermediate node 314. The intermediate node 316 includes the same set of pointers as intermediate node 314, but includes a TreeID of "2" to match the TreeID of root node 204. Intermediate node 316 is a shadow copy of intermediate node 314.

The file system manager updates a pointer of root node 304 to point to intermediate node 316 instead of pointing to intermediate node 314. The file system manager traverses tree data structure 355 from intermediate node 316 to leaf node 328, determines that the TreeID of leaf node 328 does not match the TreeID of root node 304, and creates a copy of leaf node 328. Leaf node copy 332 stores the modified value "DATA4'" and includes the same TreeID as root node 304. The file system manager updates a pointer of intermediate node 316 to point to leaf node 332 instead of pointing to leaf node 328.

In some embodiments, leaf node 332 stores the value of a key value pair that has been modified. In other embodiments, leaf node 332 stores the modified data associated with a content file that is smaller than or equal to a limit size. In other embodiments, leaf node 332 stores a pointer to a metadata structure corresponding to the modified workload. In other embodiments, leaf node 332 stores a pointer to a metadata tree corresponding to the modified workload file.

Figure 3D:
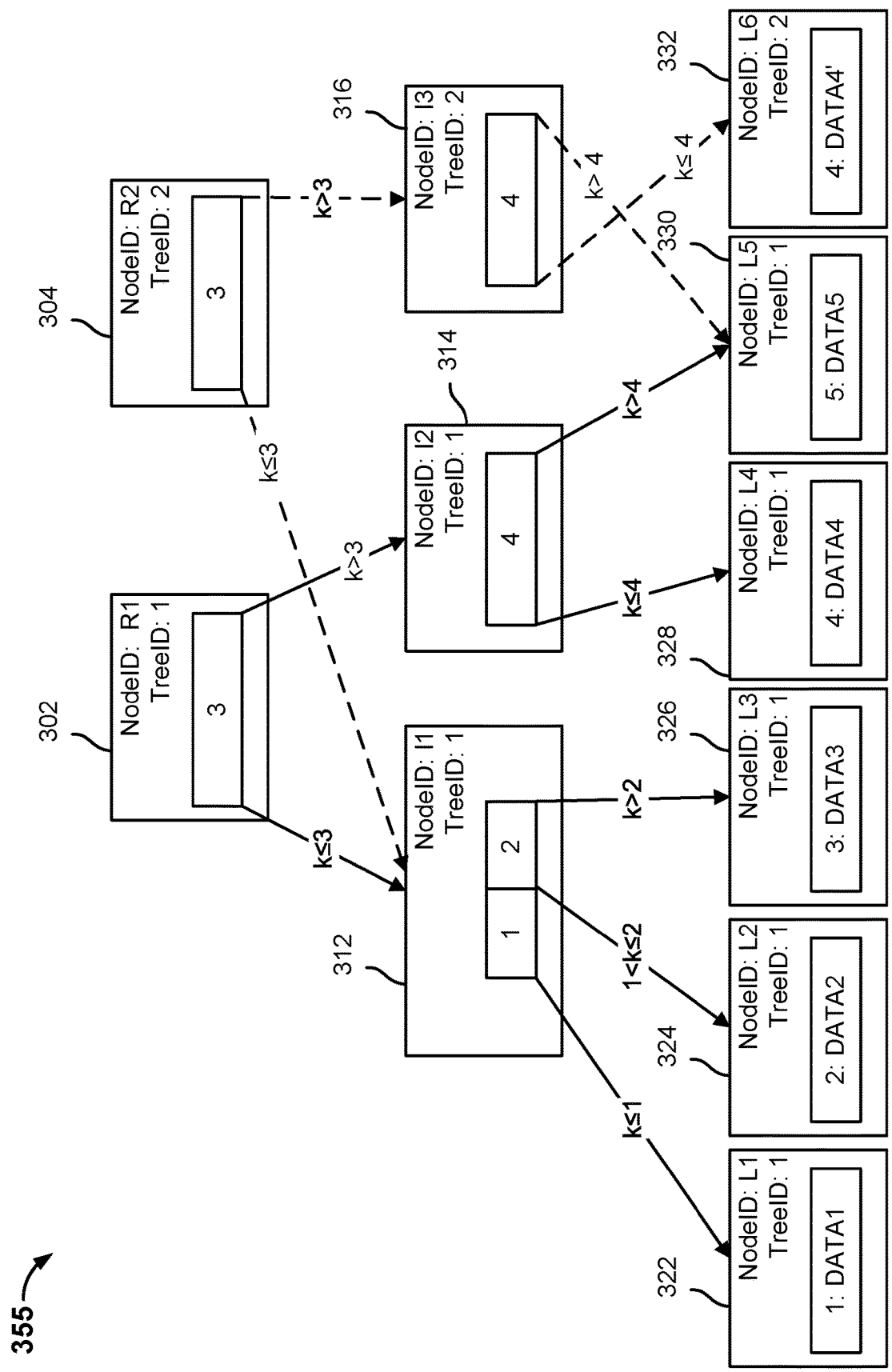
FIG. 3D is a block diagram illustrating an embodiment of a modified cloned snapshot tree.

FIG. 3D is a block diagram illustrating an embodiment of a modified cloned snapshot tree. Tree data structure 355 shown in FIG. 3D illustrates a result of the modifications made to a snapshot tree as described with respect to FIG. 3C. The snapshot tree with root node 302 may correspond to a first reference restoration point and the snapshot tree with root node 304 may correspond to a second reference restoration point. In this example, both snapshot trees are fully hydrated restoration points. A fully hydrated restoration point corresponds to a state which may be restored without having to apply one or more logged IOs. For example, a primary system or a workload may be restored to a state associated with time $t_1$ by traversing the snapshot tree having root node 302. A primary system or a workload may be restored to a state associated with time $t_{10}$ by traversing the snapshot tree having root node 304. A primary system or a workload may be restored to a state between time $t_1$ and $t_{10}$ by applying one or more data changes that are stored in a log file to the snapshot tree having root node 302 and then traversing the modified snapshot tree.

Figure 4A:
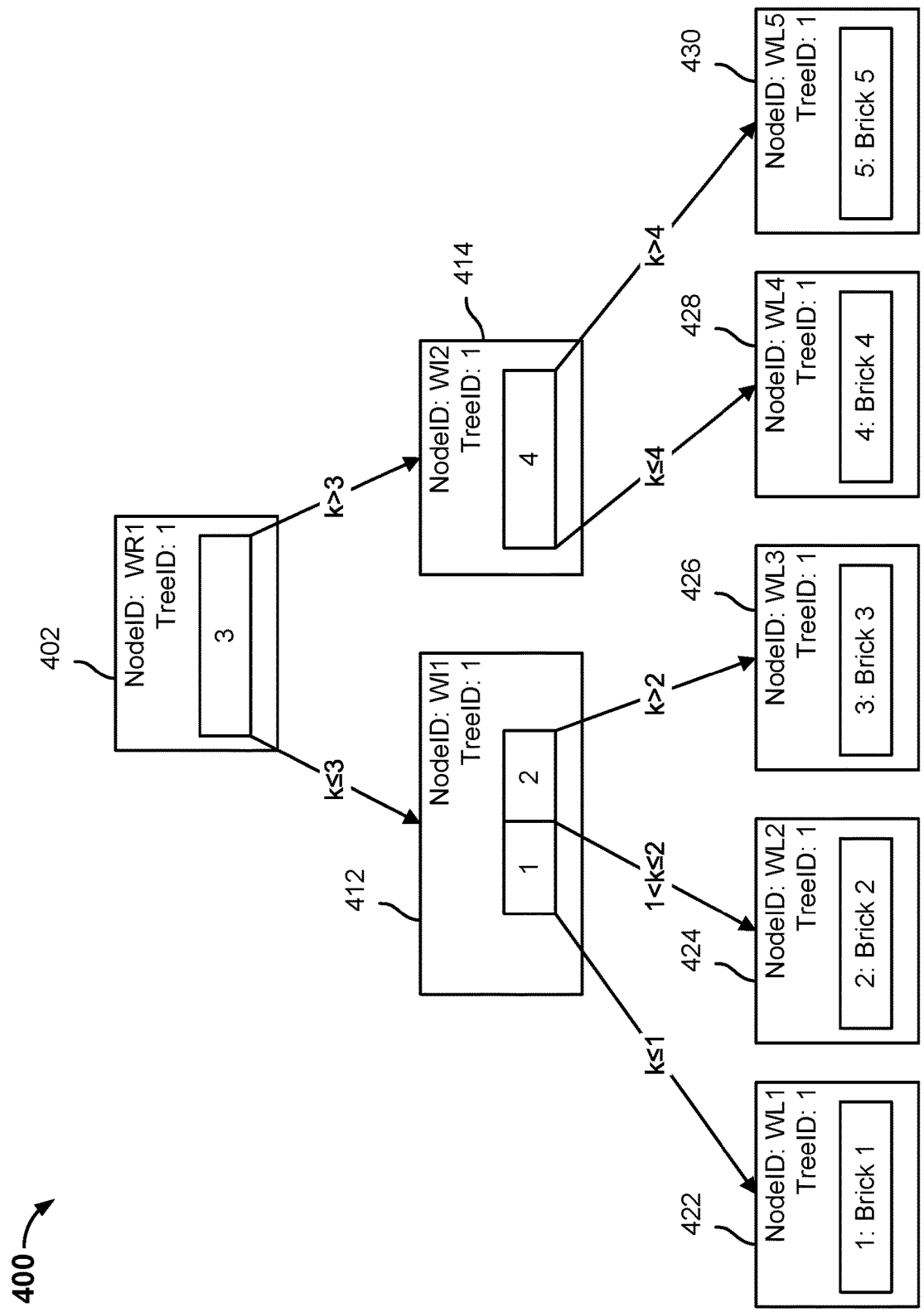
FIG. 4A is a block diagram illustrating an embodiment of a tree data structure.

FIG. 4A is a block diagram illustrating an embodiment of a tree data structure. In some embodiments, tree data structure 400 may be created by a storage system, such as storage system 112. In the example shown, tree data structure 400 corresponds to a workload and stores the metadata associated with the workload. A leaf node of a snapshot tree associated with file system data, such as a leaf node of tree data structures 300, 350, 355, may include a pointer to a tree data structure corresponding to a workload, such as tree data structure 300. Tree data structure 400 may correspond to a reference backup of a workload, e.g., a full backup of a workload.

In other embodiments, tree data structure 400 corresponds to a workload file and stores the metadata associated with the workload file. A leaf node of a snapshot tree associated with a workload, such as a leaf node of tree data structures 300, 350, 355, may include a pointer to a tree data structure corresponding to a workload file, such as tree data structure 300.

A tree data structure corresponding to a workload or workload file is a metadata structure, but is used to organize the data blocks associated with a workload or workload file that are stored on the storage system. Tree data structure 400 may be referred to as a "metadata structure" or a "metadata tree."

A tree data structure corresponding to a workload or workload file at a particular point in time (e.g., a particular version) may be comprised of a root node, one or more levels of one or more intermediate nodes, and one or more leaf nodes. In some embodiments, a tree data structure corresponding to a workload or workload file is comprised of a root node and one or more leaf nodes without any intermediate nodes. Tree data structure 400 may be a reference restoration point of a workload or workload file at a particular point in time t, for example at time $t_1$. A tree data structure associated with file system data may include one or more pointers to one or more tree data structures corresponding to one or more workloads. For example, a tree data structure may be associated with the file system data of primary system 102 and include one or more pointers to tree data structures corresponding to the one or more workloads 103.

In the example shown, tree data structure 400 includes a workload root node 402, workload intermediate nodes 412, 414, and workload leaf nodes 422, 424, 426, 428, 430. Although tree data structure 400 includes one intermediate level between root node 402 and leaf nodes 422, 424, 426, 428, 430, any number of intermediate levels may be implemented. Similar to the snapshot trees described above, each node includes a "NodeID" that identifies the node and a "TreeID" that identifies a view with which the node is associated.

In the example shown, root node 402 includes a pointer to intermediate node 412 and a pointer to intermediate node 414. Root node 402 includes a NodeID of "WR1" and a TreeID of "1."

In the example shown, intermediate node 412 includes corresponding pointers to leaf nodes 422, 424, 426. Intermediate node 412 includes a NodeID of "WI1" and a TreeID of "1." Intermediate node 412 includes a first node key and a second node key. The data key k for leaf node 422 is a value that is less than or equal to the first node key. The data key for leaf node 424 is a value that is greater than the first node key and less than or equal to the second node key. The data key for leaf node 426 is a value that is greater than the second node key. The pointer to leaf node 422 indicates that traversing tree data structure 400 from intermediate node 412 to leaf node 422 may lead to the node with a data key of "1." The pointer to leaf node 424 indicates that traversing tree data structure 400 from intermediate node 412 to leaf node 424 may lead to the node with a data key of "2." The pointer to leaf node 426 indicates that traversing tree data structure 400 from intermediate node 412 to leaf node 426 may lead to the node with a data key of "3."

In the example shown, intermediate node 414 includes a pointer to leaf node 428 and a pointer to leaf node 430. Intermediate node 414 includes a NodeID of "WI2" and a TreeID of "1." Intermediate node 414 includes a node key. The data key k for leaf node 428 is a value that is less than or equal to the node key. The data key for leaf node 430 is a value that is greater than the node key. The pointer to leaf node 428 indicates that traversing tree data structure 400 from intermediate node 414 to leaf node 428 may lead to the node with a data key of "4." The pointer to leaf node 430 indicates that traversing tree data structure 400 from intermediate node 414 to leaf node 430 may lead to the node with a data key of "5."

Leaf node 422 includes a data key-value pair of "1: Brick 1." "Brick 1" is a brick identifier that identifies the data brick that is associated with one or more data chunks of a workload or workload file. Leaf node 422 includes NodeID of "WL1" and a TreeID of "1." To view the value associated with a data key of "1," tree data structure 400 is traversed from root node 402 to intermediate node 412 to leaf node 422.

Leaf node 424 includes a data key-value pair of "2: Brick 2." "Brick 2" is a brick identifier that identifies the data brick that is associated with one or more data chunks of a workload or workload file. Leaf node 424 includes NodeID of "WL2" and a TreeID of "1." To view the value associated with a data key of "2," tree data structure 400 is traversed from root node 402 to intermediate node 412 to leaf node 424.

Leaf node 426 includes a data key-value pair of "3: Brick 3." "Brick 3" is a brick identifier that identifies the data brick that is associated with one or more data chunks of a workload or workload file. Leaf node 426 includes NodeID of "WL3" and a TreeID of "1." To view the value associated with a data key of "3," tree data structure 400 is traversed from root node 402 to intermediate node 412 to leaf node 426.

Leaf node 428 includes a data key-value pair of "4: Brick 4." "Brick 4" is a brick identifier that identifies the data brick that is associated with one or more data chunks of a workload or workload file. Leaf node 428 includes NodeID of "WL4" and a TreeID of "1." To view the value associated with a data key of "4," tree data structure 400 is traversed from root node 402 to intermediate node 414 to leaf node 428.

Leaf node 430 includes a data key-value pair of "5: Brick 5." "Brick 5" is a brick identifier that identifies the data brick that is associated with one or more data chunks of a workload or workload file. Leaf node 430 includes NodeID of "WL5" and a TreeID of "1." To view the value associated with a data key of "5," tree data structure 400 is traversed from root node 402 to intermediate node 414 to leaf node 430.

A workload or workload file may be comprised of a plurality of data chunks. A brick may be associated with one or more data chunks. In the example shown, leaf nodes 422, 424, 426, 428, 430 each store a corresponding brick identifier. The location of the one or more data chunks associated with a data brick may be identified using one or more data structures (e.g., list, table, etc.) stored in metadata store 114. A first data structure (e.g., chunk metadata table) may store information that associates a brick identifier with one or more chunk identifiers and one or more chunk file identifiers. A second data structure (e.g., chunk file metadata table) may associate a chunk file identifier with a chunk file storing a plurality of data chunks. In some embodiments, the first data structure and the second data structure are combined as a single data structure. The one or more data chunks associated with a data brick may be located based on the chunk metadata table and the chunk file metadata table. For example, a first data brick having a first brick identifier may be associated with a first chunk identifier (e.g., SHA-1 hash value). The first chunk identifier may be used in conjunction with the chunk metadata table to identify a chunk file identifier. A chunk file having the identified chunk file identifier is comprised of a plurality of data chunks. The chunk file metadata table may be used to identify a location of the plurality of data chunks. The chunk file metadata table may include offset information of the plurality of data chunks within a chunk file.

Figure 4B:
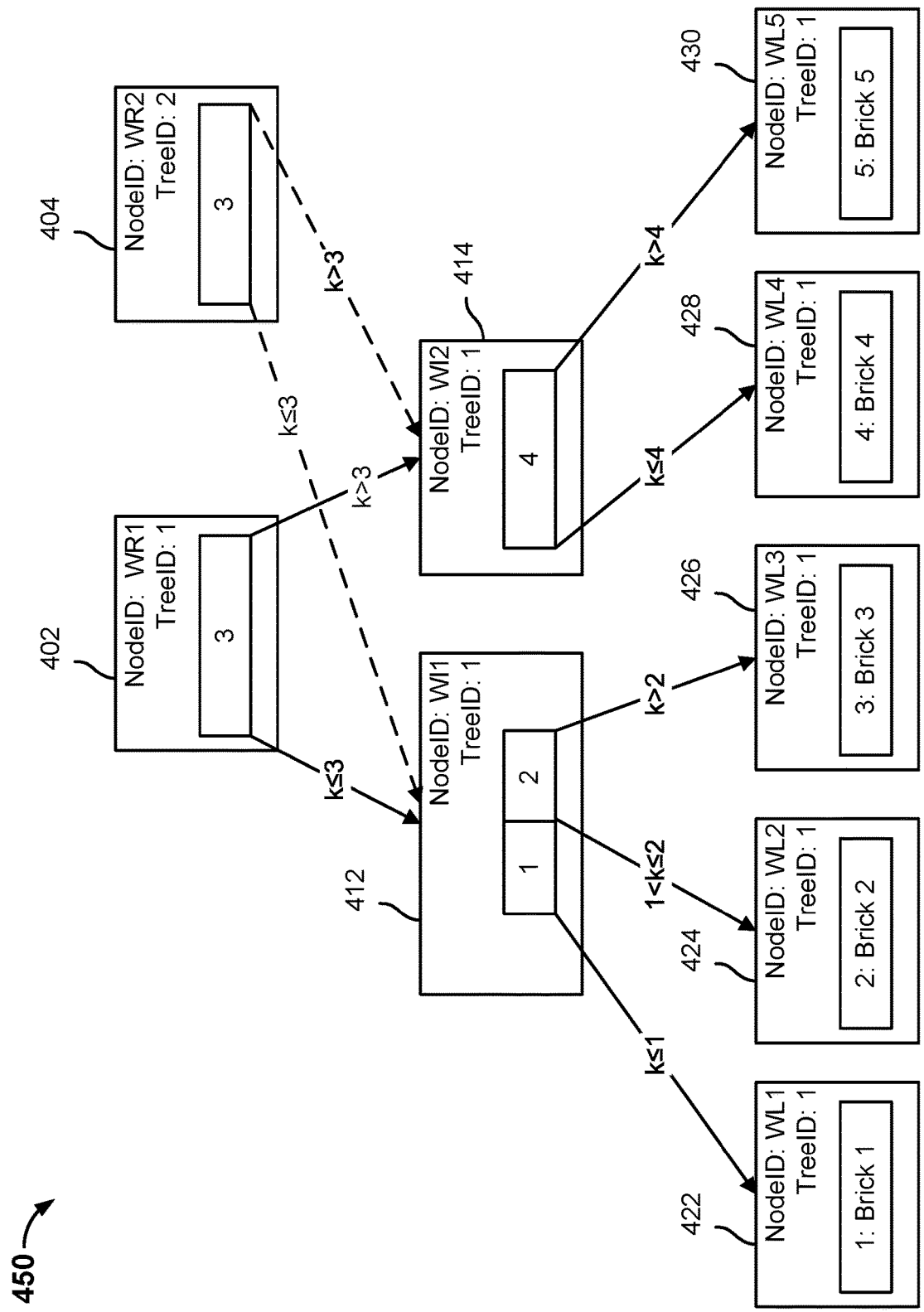
FIG. 4B is a block diagram illustrating an embodiment of a cloned metadata structure.

FIG. 4B is a block diagram illustrating an embodiment of a cloned metadata structure. A CDP service may store a log that includes one or more entries. An entry may include a snapshot marker that indicates a reference restoration point is to be generated. A file system manager may detect that an entry includes a snapshot marker. In response to detecting the snapshot marker, the file system manager may be configured to generate a reference restoration point.

A snapshot tree corresponding to a workload or workload file may be cloned to generate a reference restoration point. In some embodiments, tree data structure 450 may be created by a storage system, such as storage system 112. A CDP service of the storage system may store a log for a plurality of intercepted write IOs. The log may be comprised of a plurality of entries associated with a workload or workload file. One of the entries may include a snapshot marker, which indicates that a reference restoration point is to be generated. A file system manager of the storage system may detect the snapshot marker. Generating a reference restoration point includes cloning a snapshot tree associated with a previous reference restoration point. In some embodiments, the previous reference restoration point corresponds to a full reference restoration point of a workload or workload file. In some embodiments, the previous reference restoration point corresponds to an intermediate reference restoration point.

A tree data structure corresponding to a workload or workload file is a snapshot tree, but stores metadata associated with the workload or workload file. The tree data structure corresponding to a workload or workload file can be used to capture different versions of the workload or workload file at different moments in time. In some embodiments, the tree data structure allows a chain of metadata structures corresponding to different versions of a workload or workload file to be linked together by allowing a node of a later version of a metadata structure to reference a node of a previous version of a metadata structure. A metadata structure is comprised of a root node, one or more levels of one or more intermediate nodes, and one or more leaf nodes.

A root node or an intermediate node of a version of a metadata structure may reference an intermediate node or a leaf node of a previous version of a metadata structure. Similar to the snapshot tree, the metadata structure allows different versions of workload data to share nodes and allows data changes to a workload or workload file to be tracked.

In the example shown, tree data structure 450 includes a first metadata structure comprising root node 402, intermediate nodes 412, 414, and leaf nodes 422, 424, 426, 428, and 430. Tree data structure 450 also includes a second metadata structure that may be a snapshot of a workload or workload file at a particular point in time t+n, for example at time $t_{10}$. The second metadata structure is comprised of root node 404, intermediate nodes 412, 414, and leaf nodes 422, 424, 426, 428, and 430. To create a reference restoration point of a workload or workload file, a new root node is created. The new root node is a copy of the root node associated with the previous reference restoration point of the workload or workload file and includes the same set of pointers as the copied root node.

In the example shown, root node 404 includes a set of pointers to intermediate nodes 412, 414, which are intermediate nodes associated with a previous reference restoration point. In some embodiments, root node 404 is associated with a current view. The current view may represent a state of the workload or workload file that is up-to-date and is capable of receiving one or more modifications to the metadata structure that correspond to modifications to the file data. The TreeID of a root node indicates a reference restoration point with which the root node is associated. For example, root node 402 with a TreeID of "1" is associated with a first reference restoration point and root node 404 with a TreeID of "2" is associated with a second reference restoration point. In other embodiments, root node 404 is associated with a snapshot view. A snapshot view may represent a state of the workload or workload file at a particular moment in time in the past and is not updated.

In the example shown, root node 404 is a copy of root node 402. Root node 404 includes a first set of pointers to intermediate node 412. The first set of pointers associated with a data key (e.g., "1," "2," or "3") less than or equal to the node key indicates that traversing a file metadata tree included in tree data structure 450 from root node 404 to intermediate node 412 may lead to a leaf node with a data key of "1," "2," or "3." Root node 404 includes a second set of pointers to intermediate node 414. The second set of pointers associated with a data key greater than the node key indicates that traversing a metadata structure included in tree data structure 450 from root node 404 to intermediate node 414 may lead to a leaf node with a data key of "4" or "5."

Figure 4C:
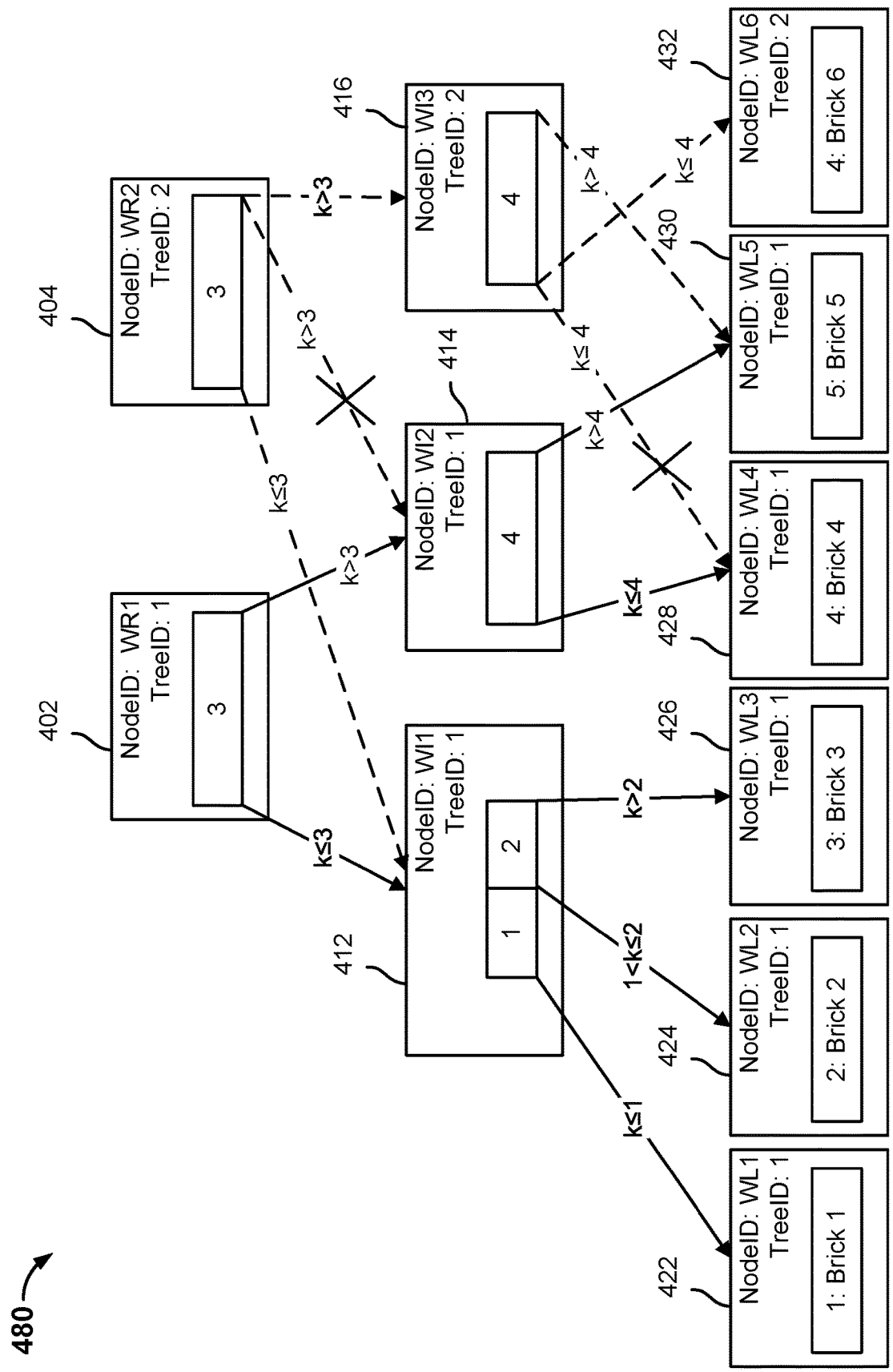
FIG. 4C is a block diagram illustrating an embodiment of modifying a cloned metadata structure.

FIG. 4C is a block diagram illustrating an embodiment of modifying a cloned metadata structure. A cloned metadata structure may be generated to generate an app consistent recovery point. A CDP service may store a log that includes one or more entries. An entry may be associated with an IO that is intercepted from a workload. The IOs associated with the one or more entries may be applied to the cloned metadata structure to generate the reference restoration point of a workload or workload file.

In the example shown, tree data structure 480 may be modified by a file system manager, such as file system manager 117. A metadata structure with root node 404 may be a current view. A current view may represent a state of a workload or workload file that is up-to-date and capable of receiving one or more modifications to the metadata structure tree that correspond to modifications to the workload data.

In some embodiments, the workload data may be modified such that one of the data chunks is replaced by another data chunk. When a data chunk of workload data associated with a previous reference restoration point is replaced with a new data chunk, the data brick associated with the new data chunk may be different. A leaf node of a metadata structure stores a brick identifier associated with a particular brick associated with the data chunk. To represent this modification to the file data, a corresponding modification is made to a current view of a metadata structure. The current view of the metadata structure is modified because the previous metadata structure is a snapshot view and can no longer be modified. The data chunk of the workload data that was replaced has a corresponding leaf node in the previous metadata structure. A new leaf node in the current view of the metadata structure is created, as described herein, that corresponds to the new data chunk. The new leaf node includes an identifier associated with the new reference restoration point. The new leaf node may also store the chunk identifier associated with the modified data chunk.

In the example shown, a data chunk included in "Brick 4" has been modified. The data chunk associated with "Brick 4"

has been replaced with a data chunk associated with "Brick 6." The file system manager starts at root node 404 because that is the root node corresponding to the reference restoration point at time $t_{10}$. The value "Brick 4" is associated with the data key "4." The file system manager traverses tree data structure 480 from root node 404 until it reaches a target node, in this example, leaf node 428. The file system manager compares the TreeID at each intermediate node and leaf node with the TreeID of the root node. In the event the TreeID of a node matches the TreeID of the root node, the file system manager proceeds to the next node. In the event the TreeID of a node does not match the TreeID of the root node, a shadow copy of the node with the non-matching TreeID is made. For example, to reach a leaf node with a data key of "4," the file system manager begins at root node 404 and proceeds to intermediate node 414. The file system manager compares the TreeID of intermediate node 414 with the TreeID of root node 404, determines that the TreeID of intermediate node 414 does not match the TreeID of root node 404, and creates a copy of intermediate node 414. Intermediate node copy 416 is a shadow copy and includes the same set of pointers as intermediate node 414, but includes a TreeID of "2" to match the TreeID of root node 404. The file system manager updates a pointer of root node 404 to point to intermediate node 416 instead of pointing to intermediate node 414. The file system manager traverses tree data structure 480 from intermediate node 416 to leaf node 428, determines that the TreeID of leaf node 428 does not match the TreeID of root node 404, and creates a copy of leaf node 428. Leaf node 432 is a copy of leaf node 428, but stores the brick identifier "Brick 6" and includes the same TreeID as root node 404. The file system manager updates a pointer of intermediate node 416 to point to leaf node 432 instead of pointing to leaf node 428.

Figure 4D:
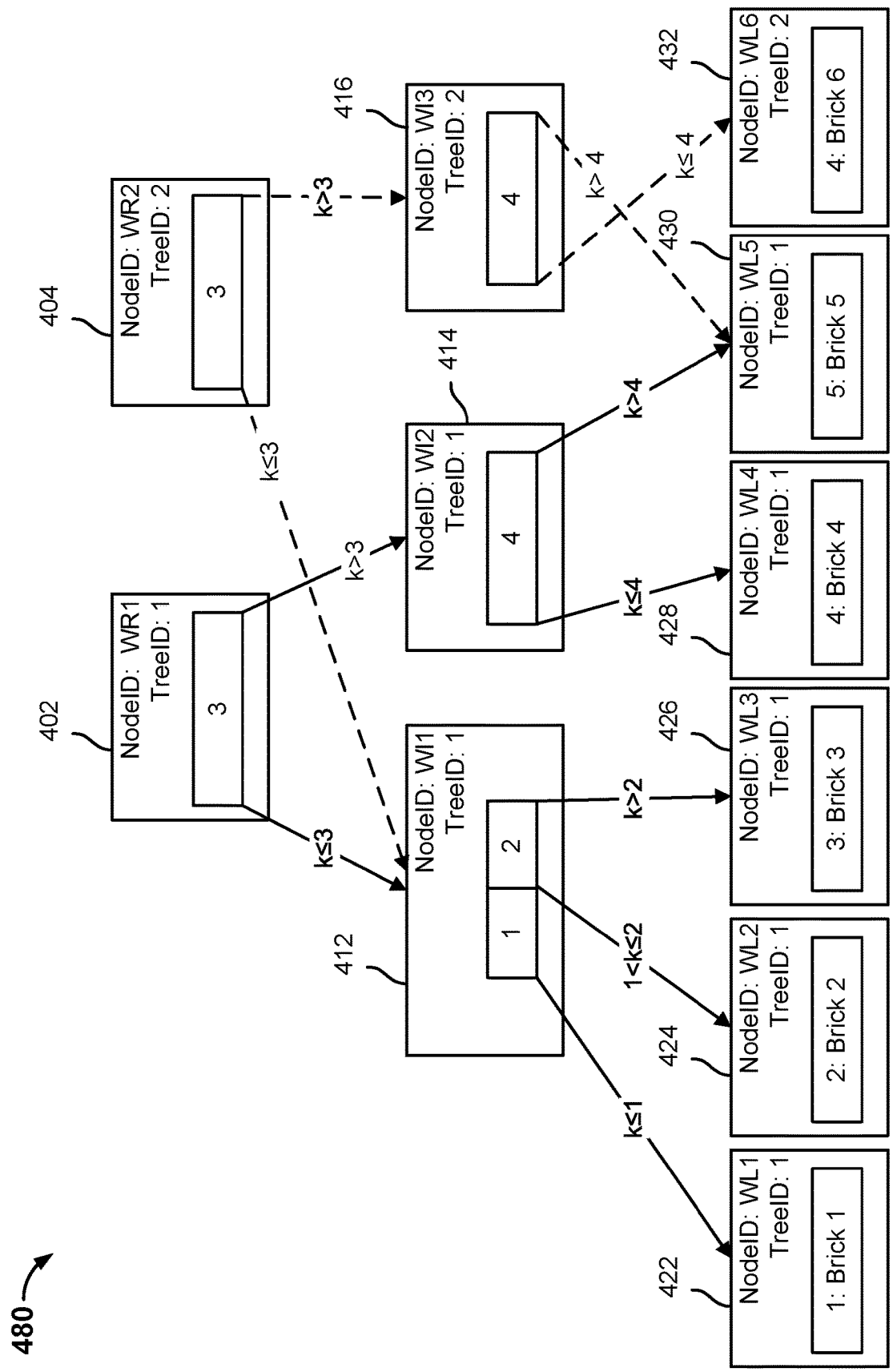
FIG. 4D is a block diagram illustrating an embodiment of a modified cloned metadata structure.

FIG. 4D is a block diagram illustrating an embodiment of a modified cloned metadata structure. The metadata tree 480 shown in FIG. 4D illustrates a result of the modifications made to file metadata tree 480 as described with respect to FIG. 4C.

The metadata structure with root node 402 may correspond to a first reference restoration point of a workload or workload file and the snapshot tree with root node 404 may correspond to a second reference restoration point of a workload or workload file. In this example, both metadata structures are fully hydrated restoration points. A fully hydrated restoration point corresponds to a state which may be restored without having to apply one or more logged IOs. For example, a workload or workload file may be restored to a state associated with time $t_1$ by traversing the metadata structure having root node 402. A workload or workload file may be restored to a state associated with time $t_{10}$ by traversing the metadata structure having root node 404. A workload or a workload file may be restored to a state between time $t_1$ and $t_{10}$ by applying one or more data changes that are stored in a log file to the metadata structure having root node 402 and then traversing the modified snapshot tree.

Figure 5:
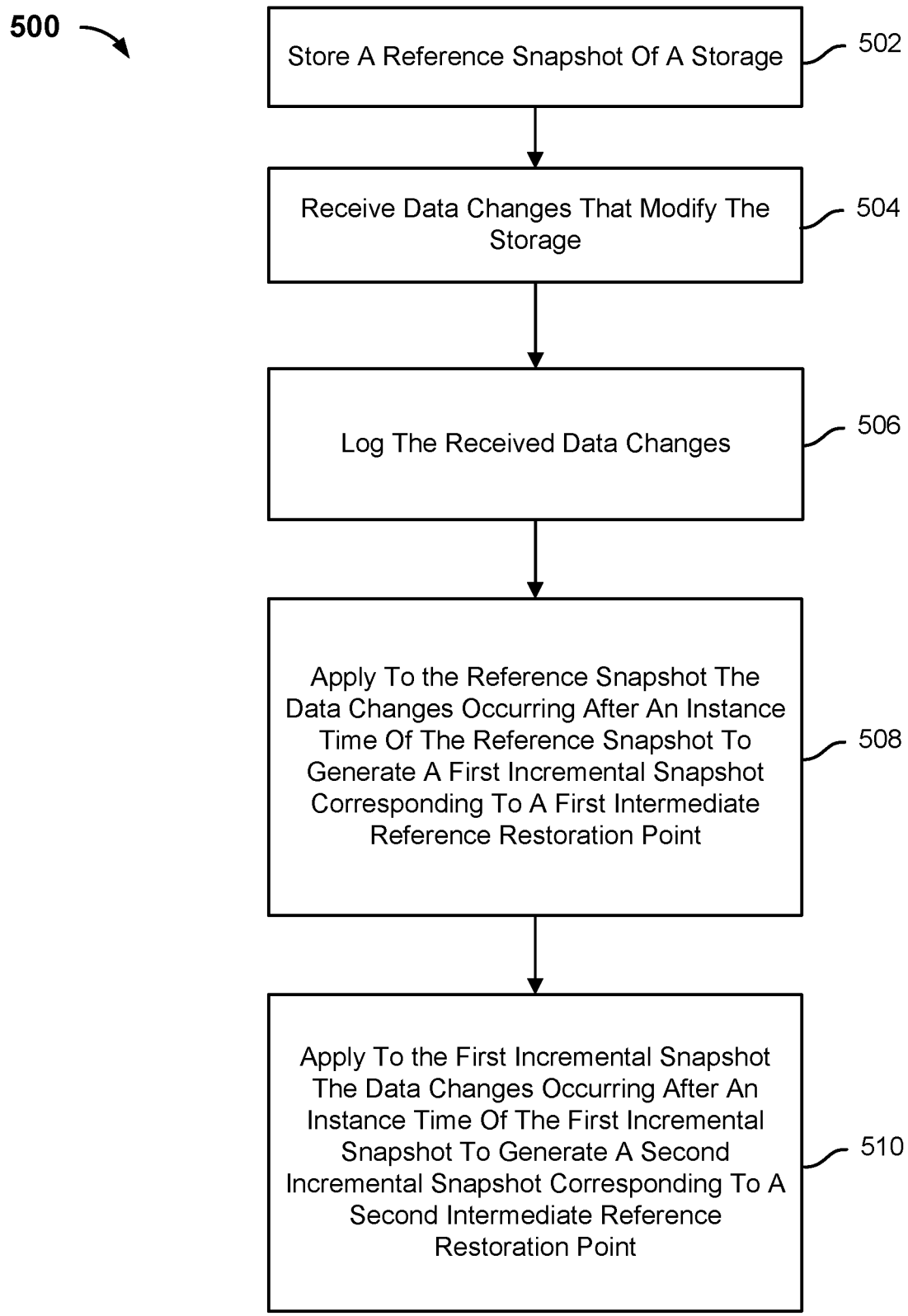
FIG. 5 is a flow chart of a process for providing continuous data protection in accordance with some embodiments.

FIG. 5 is a flow chart of a process for providing continuous data protection in accordance with some embodiments. In the example shown, process 500 may be implemented by a storage system, such as storage system 112.

At 502, a reference snapshot of a storage is stored. A reference snapshot may correspond to a full backup snapshot. In some embodiments, a full backup snapshot of a primary system is performed. The full backup snapshot may include all of the file system data associated with the primary system. In some embodiments, a full backup snapshot of a workload is performed. Examples of workloads include, but are not limited to, a virtual machine, a database, an application, a container, a pod, etc. The full backup snapshot may include all of the workload data associated with a workload.

In some embodiments, the reference snapshot of the storage corresponds to an initial full backup snapshot of the primary system. In some embodiments, the reference snapshot of the storage corresponds to an initial full backup snapshot of a workload. In other embodiments, the reference snapshot of the storage corresponds to a subsequent full backup snapshot of the primary system. In other embodiments, the reference snapshot of the storage corresponds to a subsequent full backup snapshot of the workload. A subsequent full backup snapshot may be performed in the event a gap in a sequence of IOs is detected.

A storage system may ingest the data included in the reference snapshot and generate a tree data structure. The tree data structure may include a snapshot tree and one or more metadata structures. In some embodiments, the one or more metadata structures correspond to one or more workloads hosted on a primary system. In some embodiments, the one or more metadata structures correspond to one or more workload files associated with the workload. The tree data structure corresponding to the reference snapshot may be a full reference restoration point.

At 504, one or more data changes that modify the storage are received. Each of the workloads hosted on a primary system may have an associated write filter. A write filter may be configured to intercept IOs associated with a workload and filter out the read IOs. In some embodiments, the write filter is configured to forward the intercepted write IOs to a filter daemon hosted on the primary system.

The filter daemon may be configured to collect the intercepted write IOs from one or more write filters and stream the intercepted write IOs to a CDP service of the storage system. The filter daemon may be configured to stream the intercepted write IOs as they are received. In some embodiments, the filter daemon is configured to stream batches of intercepted write IOs. The filter daemon may be configured to stream intercepted write IOs to CDP services that correspond to a workload from which the intercepted write IO is received. For example, the filter daemon may receive an intercepted write IO from a first workload and an intercepted write IO from a second workload. The filter daemon may forward the intercepted write IO from the first workload to a first CDP service running on a first storage node of the storage system and forward the intercepted write IO from the second workload to a second CDP service running on the second storage node. A CDP service hosted on a storage node may receive a stream of IOs associated with a workload.

At 506, the received data changes are logged. A CDP service may have a corresponding storage and store the received stream of IOs in a log (e.g., write-ahead log). The CDP service may receive the IOs associated with a workload as long as the workload is active. The log is comprised of a plurality of entries associated with a workload. Each entry may correspond to an IO received from the filter daemon. An entry may have an associated timestamp, IO, and an associated sequence number. In some embodiments, an entry includes a snapshot marker. In the event an entry includes a snapshot marker, a reference restoration point may be generated.

At 508, the one or more data changes occurring after an instance time of the reference snapshot are applied to the reference snapshot to generate a first incremental snapshot corresponding to a first intermediate reference restoration point. A file system manager of the storage system may detect that a log entry includes a snapshot marker. In response to detecting the snapshot marker, the file system manager may be configured to generate an intermediate reference restoration point.

The tree data structure corresponding to the previous snapshot, e.g., a reference snapshot, is identified and a root node of the tree data structure corresponding to the previous snapshot is cloned. For example, the root node of the tree data structure corresponding to the previous snapshot may be cloned in a manner that is described above with respect to FIG. 3B.

The intercepted write IOs stored in a log file may correspond to one or more data changes to a workload. The entries that occurred after a timestamp associated with the reference snapshot and before a timestamp associated with the snapshot marker may be applied to the cloned tree data structure. The entries of the log file that correspond to a workload change may be applied to the cloned tree data structure. For example, the data changes may be applied to the cloned tree data structure in a manner that is described above with respect to FIGS. 3C-3D.

The cloned tree data structure with the one or more data changes applied corresponds to the first intermediate restoration point.

At 510, the one or more data changes occurring after an instance time of the first incremental snapshot are applied to the first incremental snapshot to generate a second incremental snapshot corresponding to a second intermediate reference restoration point.

A second entry included in the log may include a snapshot marker. In response to detecting the snapshot marker in the second entry, the file system manager may be configured to generate a second intermediate reference restoration point.

The tree data structure corresponding to the previous snapshot, e.g., a reference snapshot, is identified and a root node of the tree data structure corresponding to the previous snapshot is cloned. For example, the root node of the tree data structure corresponding to the previous snapshot may be cloned in a manner that is described above with respect to FIG. 3B.

The intercepted write IOs stored in a log file may correspond to one or more data changes to a workload. The entries that occurred after a timestamp associated with the previous snapshot marker and before a timestamp associated with the current snapshot marker may be applied to the cloned tree data structure. The entries of the log file that correspond to a workload change may be applied to the cloned tree data structure. For example, the data changes may be applied to the cloned tree data structure in a manner that is described above with respect to FIGS. 3C-3D.

The cloned tree data structure with the one or more data changes applied corresponds to a second intermediate reference restoration point.

Figure 6:
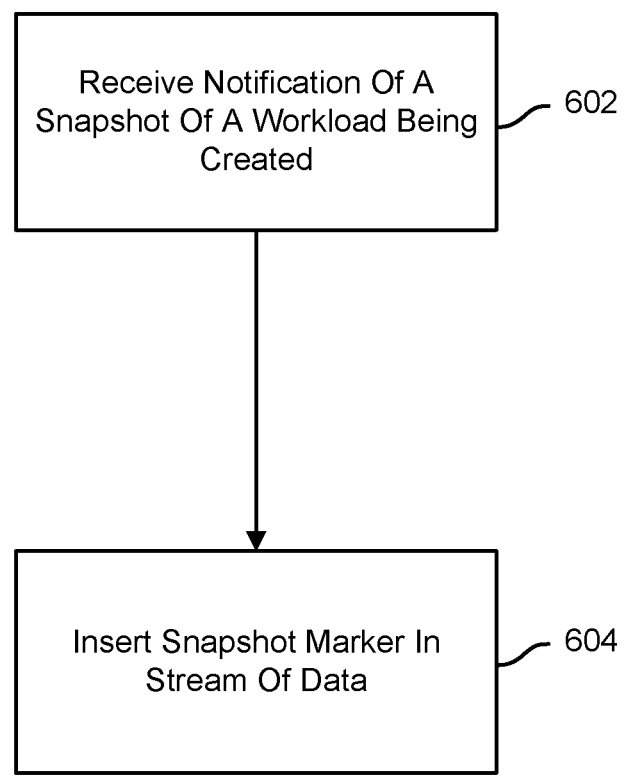
FIG. 6 is a flow chart illustrating a process of providing a reference restoration point in accordance with some embodiments.

FIG. 6 is a flow chart illustrating a process of providing a reference restoration point in accordance with some embodiments. In some embodiments, process 600 is implemented by a write filter, such as write filter 105.

At 602, a notification of a snapshot of a workload being created is received. The notification may be received from a workload. The workload may include a backup agent that notifies a write filter.

Reference restoration points may be generated based on a backup policy. In some embodiments, the backup policy indicates that reference restoration points are to be generated periodically (e.g., every 15 minutes, every 30 minutes, every 60 minutes, etc.). In some embodiments, the backup policy indicates that reference restoration points are to be generated in response to a user command. In some embodiments, the backup policy indicates that reference restoration points are to be generated after a threshold number of data changes have been logged. In some embodiments, the backup policy indicates that a reference restoration point is to be generated in the event a gap is detected in the sequenced of logged IOs.

In some embodiments, a backup agent hosted on a primary system provides to a write filter that is attached to a workload a command to provide a reference restoration point. The primary system may be comprised of a plurality of workloads. Each workload may have a corresponding write filter. The backup agent may be configured to provide the command to each of the write filters.

At 604, a snapshot marker is inserted in the stream of data. The snapshot marker may be inserted in the stream of data in between intercepted write IOs. In some embodiments, the backup agent may provide to a workload a command to quiesce the workload for a short period of time (e.g., 1 second). The snapshot marker may correspond to a point in time at which the workload is quiesced. The snapshot marker may include a timestamp that indicates a reference restoration point is associated with workload to which the write filter is attached.

Figure 7:
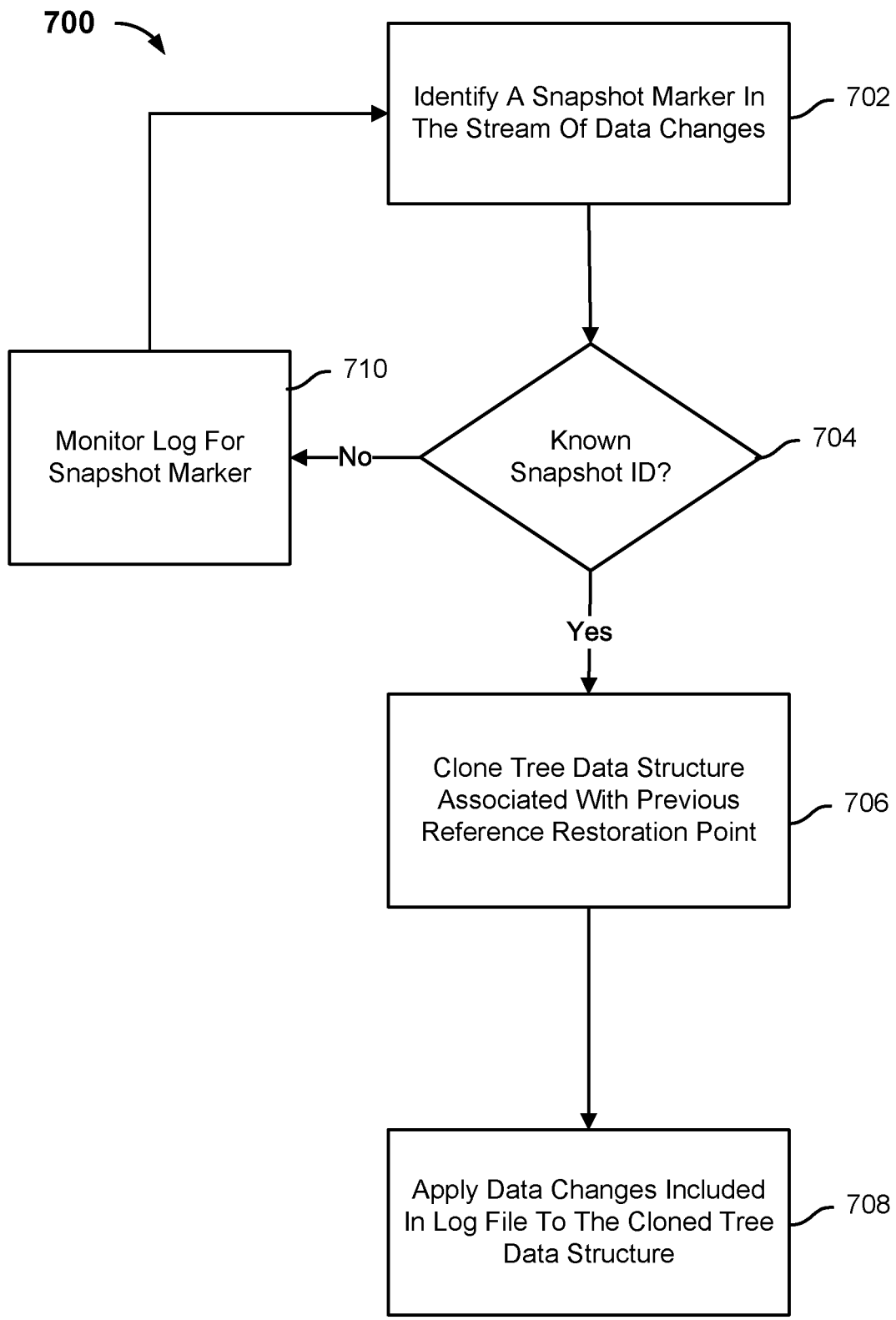
FIG. 7 is a flow chart illustrating a process for providing a reference restoration point in accordance with some embodiments.

FIG. 7 is a flow chart illustrating a process for providing a reference restoration point in accordance with some embodiments. In some embodiments, process 700 may be implemented by a storage system, such as storage system 112. In some embodiments, process 700 may be implemented to perform some or all of step 508 of process 500. In some embodiments, process 700 may be implemented to perform some or all of step 510 of process 500.

At 702, a snapshot marker is identified in the stream of data changes. A CDP service of a storage system may receive a stream of write IOs. Each write IO included in the stream may be associated with a timestamp and a sequence number. A snapshot marker may be included in the stream of data changes. A snapshot marker indicates a point in time that is associated with an app consistent recovery point.

The CDP service may store a log that includes an entry for each of the stream of data changes. The log may store a timestamp, a sequence number, and/or a snapshot marker. A file system manager of the storage system may analyze the log to determine if any of the entries include a snapshot marker.

At 704, it is determined whether the snapshot ID associated with a snapshot marker is known to the file system manager. A storage system may initiate a snapshot of a workload. The workload snapshot may have an associated ID known to the storage system (and the file system manager). A snapshot of the workload may also be initiated by an application associated with the workload. The workload snapshot may have an associated ID, but the associated ID is unknown to the storage system.

In the event the file system manager identifies a snapshot marker, the file system manager determines if the snapshot marker is associated with a snapshot ID known to the file system manager. In the event the snapshot ID is known to the file system manager, process 700 proceeds to 706. In the event the snapshot ID is unknown to the file system manager, process 700 proceeds to 710.

At 706, a tree data structure associated with a previous reference restoration point is cloned. In the event the file system manager determines that an entry includes a snapshot marker, the file system manager may identify a tree data structure associated with the previous reference restoration point and clone the tree data structure associated with the previous reference restoration point. In some embodiments, the tree data structure associated with the previous reference restoration point corresponds to a full reference restoration point. In some embodiments, the tree data structure associated with the previous recovery point correspond to an intermediate reference restoration point.

The tree data structure associated with the previous reference restoration point may be cloned by copying a root node of the tree data structure associated with the previous reference restoration point. The root node copy may be initially configured to point to the same nodes to which the root node of the tree data structure associated with the previous reference restoration point pointed.

At 708, one or more data changes included in a log file are applied to the cloned tree data structure. A data change included in a log file may correspond to new data associated with a workload, modified data associated with the workload, or deleted data associated with the workload.

In the event a data change included in the log file corresponds to new data associated with the workload, the cloned tree data structure may be updated to include one or more intermediate nodes and one or more leaf nodes corresponding to the new data associated with the workload.

In the event a data change included in the log file corresponds to modified data associated with the workload, the cloned tree data structure may be updated to include one or more intermediate nodes and one or more leaf nodes corresponding to the modified data associated with the workload, and pointers associated with one or more nodes that correspond to the old data may be updated to point to the new data.

In the event a data change included in the log file corresponds to deleted data associated with the workload, the cloned tree data structure may be updated such that pointers associated with one or more nodes that correspond to the deleted data are deleted.

After the one or more data changes included in the log file are applied to the cloned tree data structure, the modified cloned tree data structure corresponds to a reference restoration point.

At 710, the log is monitored for a snapshot marker.

Figure 8:
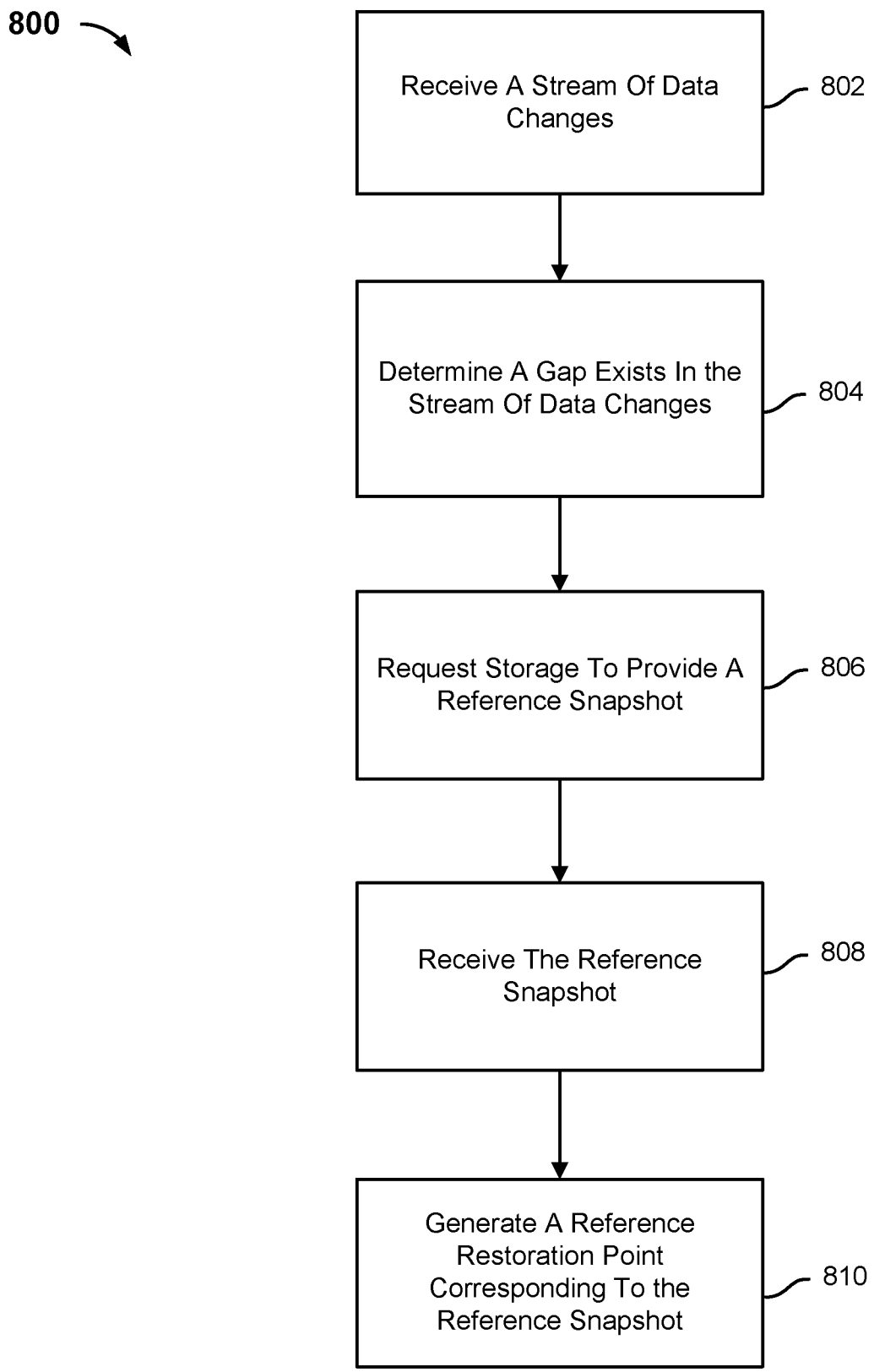
FIG. 8 is a flow chart illustrating a process for providing continuous data protection in accordance with some embodiments.

FIG. 8 is a flow chart illustrating a process for providing continuous data protection in accordance with some embodiments. Process 800 may be implemented by a storage system, such as storage system 112.

At 802, a stream of data changes is received. A write filter may be attached to a workload and configured to intercept IOs associated with the workload. The write filter may be configured to attach a sequence number to the intercepted write IO. The sequence number indicates a relative order of the particular IO in the stream of IOs. The sequence number may include an incarnation ID and a change ID. The incarnation ID may indicate an incarnation of the write filter and may be incremented each time the write filter is restarted after a crash (e.g., workload crash, filter crash). In some embodiments, the incarnation ID is not incremented after a clean restart of a workload. The change ID may be incremented for each intercepted write IO.

At 804, it is determined that a gap exists in the stream of data changes. The sequence number may be represented as [incarnation ID, change ID]. The sequence number may be [0, 0], [0, 1] . . . [0, n]. In the event the write filter goes offline (e.g., a crash) and comes back online, the incarnation ID may be incremented such that the sequence numbers attached to the intercepted write IOs may be [1, 0], [1, 1] . . . [1,n]. A gap may exist in the event the incarnation ID has been incremented.

In other embodiments, the stream of data changes may be missing an IO. For example, the stream of logged IOs may have a sequence of [0, 0], [0, 1], [0, 2], [0, 3], [0, 5]. In this example, an IO with a sequence number of [0, 4] is missing. A gap may exist in the event a change ID has been skipped in the sequence of IOs.

At 806, a reference snapshot is requested from a storage. A storage system may provide to a backup agent a command to perform a full snapshot. In some embodiments, in response to receiving the command, the backup agent causes a primary system to perform a full snapshot of its entire system. In some embodiments, in response to receiving the command, the backup agent causes a workload associated with the gap to perform a full snapshot. A snapshot marker may be inserted in the stream of IOs associated with the workload. The snapshot marker may indicate that a full reference restoration point was generated. The snapshot marker may include a snapshot ID that is known to the storage system requesting the reference snapshot.

At 808, the reference snapshot is received. In some embodiments, the reference snapshot includes all of the file system data associated with a primary system. In some embodiments, the reference snapshot includes all of the workload data associated with a workload.

At 810, a reference restoration point corresponding to the reference snapshot is generated. A storage system may ingest the data included in the reference snapshot and generate a tree data structure. Tree data structures, such as the examples depicted in FIGS. 3A and 4A may be generated. The tree data structure may include a snapshot tree and one or more metadata structures. In some embodiments, the one or more metadata structures correspond to one or more workloads hosted on a primary system. In some embodiments, the one or more metadata structures correspond to one or more workload files associated with the workload.

In some embodiments, the reference restoration point includes all of the file system data associated with the primary system. In some embodiments, the reference restoration point includes all of the workload data of a workload. Examples of workloads include, but are not limited to, a virtual machine, a database, an application, a container, a pod, etc.

Figure 9:
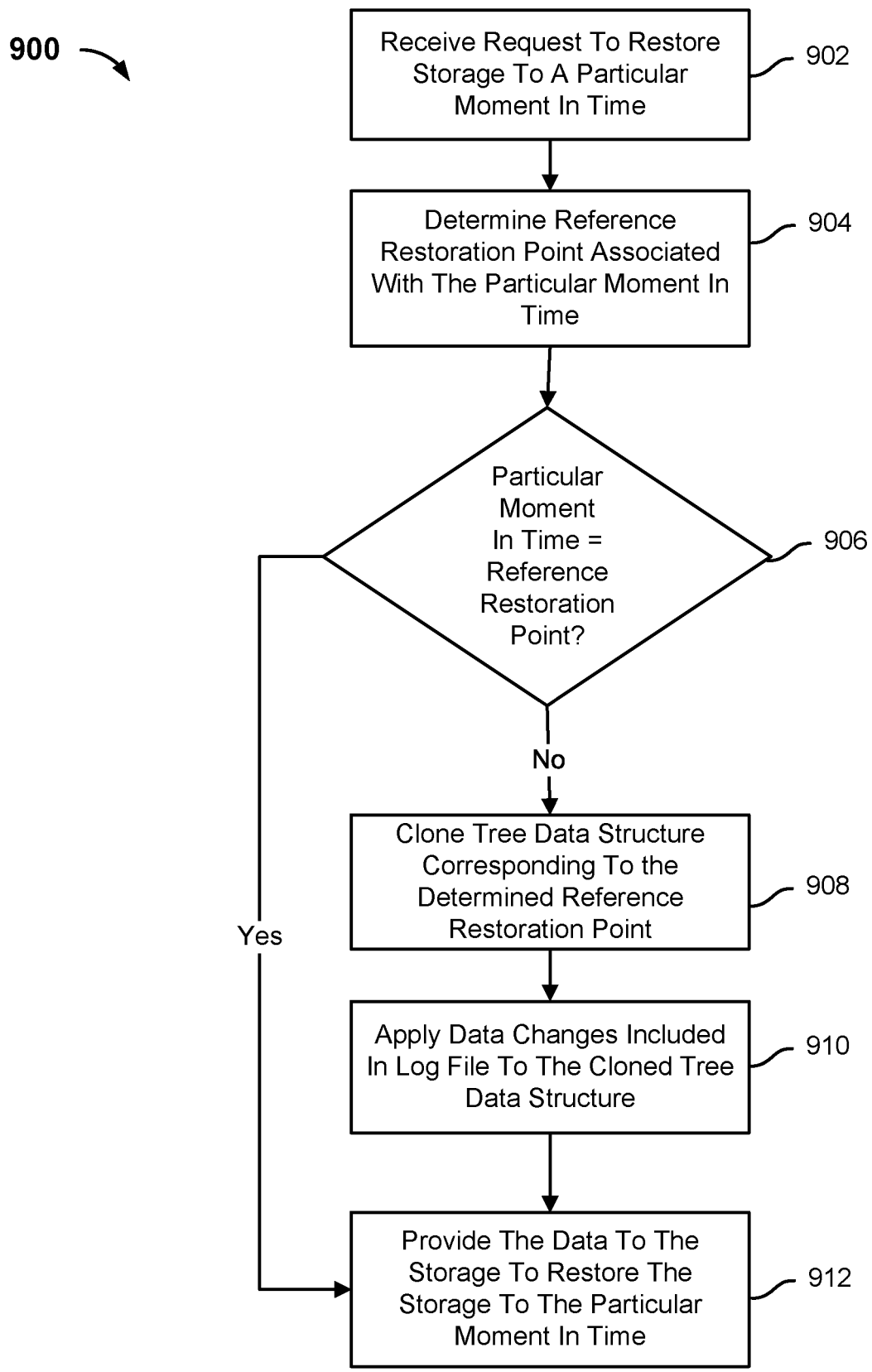
FIG. 9 is a flow chart illustrating a process for restoring data in accordance with some embodiments.

FIG. 9 is a flow chart illustrating a process for restoring data in accordance with some embodiments. Process 900 may be implemented by a storage system, such as storage system 112.

At 902, a request to restore a storage to a particular moment in time is received. In some embodiments, the particular moment in time corresponds to reference restoration point. In some embodiments, the particular moment in time corresponds to a point in time that is between reference restoration points.

At 904, a reference restoration point associated with the particular moment in time is determined. The determined reference restoration point associated with the particular moment in time corresponds to the reference restoration point that occurred before or at the particular moment in time.

In some embodiments, the particular moment in time corresponds to a reference restoration point. For example, as seen in FIG. 2, reference restoration points exist at 12:00 pm, 12:15 pm, 12:30 pm, 12:45 pm, and 1:00 pm.

In some embodiments, the particular moment in time does not correspond to a reference restoration point. For example, as seen in FIG. 2, the request may be to restore the storage to a point in time that is between 12:00 pm and 12:15 pm, between 12:15 pm and 12:30 pm, between 12:30 pm and 12:45 pm, or between 12:45 pm and 1:00 pm.

At 906, it is determined whether the particular moment in time corresponds to a reference restoration point. In the event the particular moment in time corresponds to a reference restoration point, process 900 proceeds to 912. In the event the particular moment in time does not correspond to a reference restoration point, process 900 proceeds to 908.

At 908, a tree data structure corresponding to the determined reference restoration point is cloned. In some embodiments, the tree data structure corresponding to the determined reference restoration point is the tree data structure corresponding to an app consistent recovery point that occurs before the particular moment in time. In other embodiments, the tree data structure corresponding to the determined reference restoration point is the tree data structure corresponding to an app consistent recovery point that occurs after the particular moment in time.

The tree data structure corresponding to the determined reference restoration point may be cloned by copying a root node of the tree data structure corresponding to the determined reference restoration point.

At 910, one or more data changes included in the log file are applied to the cloned tree data structure. A log may store a plurality of entries. The plurality of entries may include entries that occur after a point in time corresponding to the determined reference restoration point and up to the particular moment in time. Each entry is associated with an IO. The IOs associated with the entries that occur after a point in time corresponding to the determined reference restoration point and up to the particular moment in time may be applied to the cloned tree data structure to modify the tree data structure in a manner that is consistent with the particular moment in time.

At 912, the data is provided to the storage to restore the storage to the particular moment in time. In some embodiments, the tree data structure corresponding to the reference restoration point is traversed, the data associated with the particular moment in time is located, and the located data is provided to a system to restore the system.

In other embodiments, the modified tree data structure may be traversed to locate the data. The data may be accessed and provided to the storage to restore the storage to the particular moment in time when the particular moment in time does not correspond to a reference restoration point.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   storing a reference snapshot of a storage;
   receiving at a storage system a stream of data changes that modify the storage, wherein the data changes are captured by a write filter of the storage, wherein each of the data changes is associated with a corresponding sequence number that indicates a relative order of data changes in the stream of data changes;
   logging the received data changes in a log;
   determining that a first log entry includes a first snapshot marker;
   in response to determining that the first log entry includes the first snapshot marker, generating a first incremental snapshot corresponding to a first intermediate reference restoration point by cloning a tree data structure associated with the reference snapshot and applying to the tree data structure associated with reference snapshot a first set of data changes stored in the log that occurred after an instance time of the reference snapshot and before the first snapshot marker based on a first order in which one or more data changes included in the first set occurred;
   determining that a second log entry includes a second snapshot marker;
   in response to determining that the second log entry includes the second snapshot marker, generating a second incremental snapshot corresponding to a second intermediate reference restoration point by cloning a tree data structure associated with the first incremental snapshot and applying to the tree data structure associated with first incremental snapshot a second set of data changes stored in the log that occurred after an instance time of the first incremental snapshot and before the second snapshot marker based on a second order in which one or more data changes included in the second set occurred;
   determining that a gap exists in the log of the received data changes based on a missing sequence number associated with data changes included in the log; and
   in response to determining that the gap exists in the log of the received data changes:
      requesting a second reference snapshot of the storage, and
      generating a full reference restoration point based on the second reference snapshot.

2. The method of claim 1, wherein the write filter is configured to receive a notification of a snapshot of a workload being created.

3. The method of claim 2, wherein in response to receiving the notification of the snapshot of the workload being created, the write filter is configured to insert a snapshot marker into the stream of data changes.

4. The method of claim 1, wherein the corresponding sequence numbers include corresponding incarnation identifiers and corresponding change identifiers.

5. The method of claim 1, wherein the write filter is attached to a workload of the storage prior to the reference snapshot being initiated.

6. The method of claim 1, further comprising receiving a request to restore the storage to a particular moment in time.

7. The method of claim 6, further comprising determining a reference restoration point associated with the particular moment in time.

8. The method of claim 7, further comprising:
determining that the determined reference restoration point is equal to the particular moment in time; and
providing data associated with the reference restoration point.

9. The method of claim 7, further comprising:
determining that the determined reference restoration point is not equal to the particular moment in time;
cloning a tree data structure associated with the determined reference restoration point; and
modifying the cloned tree data structure by applying one or more data changes included in the log to the cloned tree data structure.

10. The method of claim 9, further comprising providing data associated with the modified cloned tree data structure.

11. A computer program product, the computer program product being embodied in a non-transitory computer readable storage medium and comprising computer instructions for:
storing a reference snapshot of a storage;
receiving at a storage system a stream of data changes that modify the storage, wherein the data changes are captured by a write filter of the storage, wherein each of the data changes is associated with a corresponding sequence number that indicates a relative order of data changes in the stream of data changes;
logging the received data changes in a log;
determining that a first log entry includes a first snapshot marker;
in response to determining that the first log entry includes the first snapshot marker, generating a first incremental snapshot corresponding to a first intermediate reference restoration point by cloning a tree data structure associated with the reference snapshot and applying to the tree data structure associated with reference snapshot a first set of one or more data changes stored in the log that occurred after an instance time of the reference snapshot and before the first snapshot marker based on a first order in which one or more data changes included in the first set occurred;
determining that a second log entry includes a second snapshot marker;
in response to determining that the second log entry includes the second snapshot marker, generating a second incremental snapshot corresponding to a second intermediate reference restoration point by cloning a tree data structure associated with the first incremental snapshot and applying to the tree data structure associated with first incremental snapshot a second set of one or more data changes stored in the log that occurred after an instance time of the first incremental snapshot and before the second snapshot marker based on a second order in which one or more data changes included in the second set occurred;
determining that a gap exists in the log of the received data changes based on a missing sequence number associated with data changes included in the log; and
in response to determining that the gap exists in the log of the received data changes:
requesting a second reference snapshot of the storage, and
generating a full reference restoration point based on the second reference snapshot.

12. The computer program product of claim 11, wherein the write filter is configured to receive a notification of a snapshot of a workload being created wherein in response to receiving the notification of the snapshot of the workload being created, the write filter is configured to insert a snapshot marker into the stream of data changes.

13. The computer program product of claim 11, wherein the corresponding sequence numbers include corresponding incarnation identifiers and corresponding change identifiers.

14. A system, comprising:
a processor configured to:
store a reference snapshot of a storage;
receive a stream of data changes that modify the storage, wherein the data changes are captured by a write filter of the storage, wherein each of the data changes is associated with a corresponding sequence number that indicates a relative order of data changes in the stream of data changes;
log the received data changes in a log;
determining that a first log entry includes a first snapshot marker;
in response to determining that the first log entry includes the first snapshot marker, generate a first incremental snapshot corresponding to a first intermediate reference restoration point by cloning a tree data structure associated with the reference snapshot and applying to the tree data structure associated with reference snapshot a first set of data changes occurring after an instance time of the reference snapshot and before the first snapshot marker based on a first order in which one or more data changes included in the first set occurred;
determining that a second log entry includes a second snapshot marker;
in response to determining that the second log entry includes the second snapshot marker, generate a second incremental snapshot corresponding to a second intermediate reference restoration point by cloning a tree data structure associated with the first incremental snapshot and applying to the tree data structure associated with first incremental snapshot a second set of data changes stored in the log that occurred after an instance time of the first incremental snapshot and before the second snapshot marker based on a second order in which one or more data changes included in the second set occurred;
determine that a gap exists in the log of the received data changes based on a missing sequence number associated with data changes included in the log; and
in response to a determination that the gap exists in the log of the received data changes:
request a second reference snapshot of the storage, and
generate a full reference restoration point based on the second reference snapshot; and a memory coupled to the processor and configured to provide the processor with instructions.

* * * * *

UNITED STATES PATENT AND TRADEMARK OFFICE
CERTIFICATE OF CORRECTION

PATENT NO. : 11,573,861 B2
APPLICATION NO. : 16/549719
DATED : February 7, 2023
INVENTOR(S) : Shobhit Agarwal et al.

It is certified that error appears in the above-identified patent and that said Letters Patent is hereby corrected as shown below:

On the Title Page

Column 2, item (56), U.S. patent documents, cite no. 3, delete "3,020,037" and insert --8,020,037--, therefor.

In the Claims

In Column 31, Line(s) 6, Claim 4, delete "numbers" and insert --number--, therefor.
In Column 31, Line(s) 6, Claim 4, delete "include" and insert --includes a--, therefor.
In Column 31, Line(s) 6 & 7, Claim 4, after "incarnation", delete "identifiers" and insert --identifier--, therefor.
In Column 31, Line(s) 7, Claim 4, after "change", delete "identifiers" and insert --identifier--, therefor.
In Column 32, Line(s) 20, Claim 13, delete "numbers" and insert --number--, therefor.
In Column 32, Line(s) 20, Claim 13, delete "include" and insert --includes a--, therefor.
In Column 32, Line(s) 21, Claim 13, after "incarnation", delete "identifiers" and insert --identifier--, therefor.
In Column 32, Line(s) 21, Claim 13, after "change", delete "identifiers" and insert --identifier--, therefor.

Signed and Sealed this
Seventeenth Day of October, 2023

Katherine Kelly Vidal
*Director of the United States Patent and Trademark Office*